United States Patent
Sobe et al.

(10) Patent No.: US 6,904,064 B2
(45) Date of Patent: Jun. 7, 2005

(54) OPTICAL FIBER TRANSMISSION SYSTEM, RAMAN GAIN CONTROL DEVICE AND RAMAN GAIN CONTROL METHOD

(75) Inventors: Masaaki Sobe, Tokyo (JP); Yutaka Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 281 days.

(21) Appl. No.: 10/283,171

(22) Filed: Oct. 30, 2002

(65) Prior Publication Data

US 2003/0117694 A1 Jun. 26, 2003

(30) Foreign Application Priority Data

Oct. 31, 2001 (JP) ........................................ 2001-335653

(51) Int. Cl.[7] ................................................. H01S 3/30
(52) U.S. Cl. ............................. 372/6; 372/71; 359/334; 385/123
(58) Field of Search ....................... 372/6, 71; 359/334; 385/123

(56) References Cited

U.S. PATENT DOCUMENTS 6,771,864 B2 * 8/2004 Kubo et al. .................. 385/123
6,775,057 B2 * 8/2004 Akasaka et al. ................ 372/6
6,795,235 B1 * 9/2004 Okuno et al. ................ 359/334

FOREIGN PATENT DOCUMENTS

JP          2001-7768          1/2001

OTHER PUBLICATIONS

Howard Kidorf, et al., "Pump Interactions in a 100–mm Bandwith Raman Amplifier," *IEEE Photonics Technology Letters*, vol. 11, No. 5, pp. 530–532 (May 1999).

* cited by examiner

*Primary Examiner*—Minsun Oh Harvey
*Assistant Examiner*—Cornelius H. Jackson
(74) *Attorney, Agent, or Firm*—Foley & Lardner LLP

(57) ABSTRACT

A Raman gain control method of controlling a Raman gain caused by simultaneous application of pump lights of a plurality of wavelengths to an optical fiber, which includes, based on a relation of a ratio coefficient which is a ratio of power of each pump light to total power of all the pump lights with the Raman gain, from a designated value of the Raman gain, calculating power of each pump light realizing the designated Raman gain within a designated wavelength range, and controlling power of each pump light applied to the optical fiber to apply each pump light at each power calculated.

8 Claims, 10 Drawing Sheets

OPTICAL FIBER TRANSMISSION SYSTEM, RAMAN GAIN CONTROL DEVICE AND RAMAN GAIN CONTROL METHOD

BACKGROUND OF THE INVENTION

1. Field of the Invention

The present invention relates to a method of controlling power of pump light in wideband Raman amplification using an optical fiber.

2. Description of the Related Art (Distributed Raman Amplification)

In the field of communication systems using an optical fiber transmission line, development is under way for commercializing distributed Raman amplification (DRA) techniques. Optical fiber for use in basic transmission networks today employs quartz glass as a base material. Raman amplification is a phenomenon that making signal light and pump light having a frequency about 13 THz higher than that of the signal light be simultaneously incident on quartz glass causes part of energy of the pump light to move to the signal light through the stimulated Raman scattering effect of the quartz glass. As a result, the signal light is subjected to amplification. Gain obtained as a result of Raman amplification will be referred to as a Raman gain hereinafter. An actual Raman gain has such wavelength dependency as shown in FIG. 14, which will be referred to as a Raman gain profile hereinafter.

Distributed Raman amplification is a mode of applying pump light to an optical fiber which transits signal light to obtain the Raman amplification effect with the optical fiber transmission line itself as an amplification medium. Since a propagation loss of a transmission line is compensated for by Raman amplification, an optical fiber transmission system using distributed Raman amplification enables extension of a distance in which the signal is transmittable.

Example of an optical fiber transmission system using distributed Raman application is shown in FIG. 18. In each repeater plant, pump light from a pump light source 30 is applied to a transmission line fiber 10 through a WDM coupler 20 to obtain the Raman amplification effect.

(Raman Gain Slope)

A Raman gain (dB), which is generated when pump light of certain power (W) is applied to an optical fiber as a Raman amplification medium, normalized by the power of the pump light is referred to as Raman gain slope (dB/W). Description will be in the following made of that measurement of Raman gain slope is important in distributed Raman amplification.

Raman gain slope varies with an individual fiber. To begin with, optical fibers laid as basic transmission networks have various kinds and Raman gain slope depends on a mode field diameter (core diameter), an amount of $GeO_2$ addition, absorption of water (OH), etc. of the optical fibers. These parameters also vary with a manufacturer, manufacturing time and a lot of an optical fiber.

Another chief factor in variation is a station loss. In a large repeater plant in particular, there exist connector connections at several sites from a room where a pump light source is placed to a transmission line fiber to involve a loss of several dB in many cases. With a transmission system using no distributed Raman amplification, station loss can be taken into consideration as one with a section loss between repeaters. In distributed Raman amplification, however, a loss caused before pump light reaches a transmission line fiber is special and therefore needs another specification.

Thus, when distributed Raman amplification is conducted on an existing transmission line whose parameters affecting a gain largely vary, it is difficult to predict power of pump light required for obtaining a desired Raman gain in advance. Adjustment at site is therefore needed which costs labor and time. Elimination of the need of adjustment could be realized when conditions of a site such as properties of a transmission line optical fiber and loss characteristics in a repeater plant can be measured as Raman gain slope. This enables power of pump light required for obtaining a certain gain to be predicted with high precision.

(Composite Raman Gain Profile)

As shown in FIG. 14, since a band in which a Raman gain profile obtained by a single pump wavelength has a peak is about 15 nm, when a wider band is required, it is necessary to make a plurality of pump lights of different wavelengths simultaneously enter a transmission line and overlap the same to compose a gain profile as shown in FIG. 15. Raman gain profile thus obtained by pump using a plurality of pump wavelengths will be hereinafter referred to as a composite Raman gain profile. On the other hand, a Raman gain profile obtained using a single pump wavelength will be referred to as a single wavelength pump Raman gain profile.

(Conventional Method of Obtaining Desired Composite Raman Gain Profile)

In order to make a desired gain be generated at a desired wavelength band by using a composite Raman gain profile, it is necessary to solve an optimization problem of how much power is to be excited at which wavelength. When optimization is insufficient, irregular gains will be generated in a wavelength band in which a gain profile should be flat, so that a gain profile will incline or useless gain will be generated at an unnecessary wavelength band. In terms of cost reduction, optimization should be conducted so as to have as small the number of pump light sources and total power of pump light as possible. This is because an increase in the number of light sources is followed by not only by an increase in costs of light sources but also by reduction in cost performance caused by an increase in costs of parts necessary for multiplexing, by a power loss at the time of multiplexing, etc.

This problem can be solved by trial and error. In a case of FIG. 15, for example, a composite Raman gain profile which has a flat part of 7.5 dB in a band of about 80 nm is attained in an SMF by five pump lights of different wavelengths. Although such method realized by trial and error is possible in a laboratory, it is impractical to execute the method at a site of installation in terms of labor, time and skill required for adjustment.

(Necessity of Controlling Output Signal Power to be Constant in Amplification Repeater)

Since in a terrestrial transmission system, a repeater installation place is limited as compared with a submarine-based system, it is very unlikely that fiber losses between repeater plants have constant values. In addition, it is known that fibers are liable to be affected by weather and atmospheric phenomena and be increased or decreased in day or seasonal cycle depending on a surrounding temperature of an installation place. Moreover, signal transmission power of an immediately preceding repeater has a little fluctuation or error. As a result, transmission signal power applied to a repeater has a margin.

On the other hand, in an amplification repeater, it is desirable to conduct control to maintain power of a signal having been amplified, that is, relay output power, by increasing or decreasing a gain. The reason is that multi-stage relay with a gain fixed might result in having a signal level going excessively higher or lower than expected. Since control for maintaining power of a signal having been amplified is equivalent to control of canceling a loss including fluctuation in a section preceding to the repeater by means of the repeater to restore the signal power, a signal level in the multi-stage relay system can be stabilized.

Conventional optical amplification repeater is formed of an Er-doped optical fiber amplifier (EDFA) and in general includes a control circuit for maintaining signal output to be constant by adjusting power of pump light to an Er-doped optical fiber. When Raman amplification is to be applied to amplification relay, desired is a mechanism that enables a Raman gain to be dynamically changed to have constant signal output power.

As described in the foregoing, for obtaining a desirable composite Raman gain profile, adjustment of power of pump light by trial and error is conventionally required. On the other hand, because Raman gain slope of a laid optical fiber largely varies with each fiber, optimum power of pump light varies with each fiber accordingly, so that adjustment at site requiring labor and time is required.

Moreover, even if power of pump light is appropriately set at the time of installation, with power of pump light fixed, the power might deviate from an optimum point as a line changes with time. Taken as an extreme example is a case where a fiber between stations disconnects to switch to a spare fiber between stations. Also, even with the same fiber between stations, a loss in the station might change when wiring in the station is modified or an optical connector is attached or detached, thereby causing deviation of optimum power of pump light. In addition, as described above, there occur variation of a loss of a fiber between stations and variation of signal transmission power of an immediately preceding repeater. In order to cope with these time-changing phenomena, required is a mechanism for active control to have optimum power of pump light at any time.

As such a mechanism, proposed is, for example, a method of obtaining a desired Raman gain profile by trial and error by individually changing power of each pump light while monitoring a composite Raman gain profile by means of an optical spectrum analyzer (e.g. Japanese Patent Laying-Open (Kokai) No. 2001-007768). The method employing monitoring of a composite Raman gain profile, however, has a fatal shortcoming that monitoring is impossible unless signal light exists there. Some of customers have a request for reducing the number of initial multi channels in a wavelength multiplex communication system to a minimum necessary number and additionally increasing the number of channels according to an increase in a demand for communication traffic in order to suppress initial investment. In this case, it is common that together with the request, another request is made that operation of adding a channel should be executed without affecting an existing channel while it is operated. For this purpose, a Raman gain of a wavelength band in which channel is yet to be applied should be controlled with sufficient precision and such a manner of conducting negative-feedback control by monitoring a composite Raman gain profile is hard to be applied.

That a composite Raman gain profile can be maintained without monitoring and can actively cope with a time-changing phenomenon is equivalent to that open-loop control of the composite Raman gain profile is possible. None of such a method has been ever proposed.

SUMMARY OF THE INVENTION

A first object of the present invention is to provide a Raman gain control device and a Raman gain control method which eliminate the above-described conventional problems and enable determination of power of each of a plurality of pump lights having different frequencies for use in realizing a designated gain level G by a flat gain profile.

A second object of the present invention is to provide a Raman gain control device and a Raman gain control method which eliminate the above-described conventional problems and enable determination of power of each of a plurality of pump lights having different frequencies for use in realizing, with respect to a designated gain level G and a gain inclination α indicative of an inclination of a gain profile, the gain level G by a gain profile having a straight inclination which is designated by the gain inclination α.

A third object of the present invention is to provide a Raman gain control device and a Raman gain control method which eliminate the above-described conventional problems and enable a gain profile in a model transmission line to be reproduced in other transmission line.

According to the first aspect of the invention, a Raman gain control method of controlling a Raman gain caused by simultaneous application of pump lights of several wavelengths to an optical fiber, comprising the steps of based on a relation of a ratio coefficient which is a ratio of power of each the pump light to total power of all the pump lights with the Raman gain and a relation between the total power and the Raman gain, from a designated value of the Raman gain, calculating power of each the pump light providing the designated Raman gain within a designated wavelength range, and controlling power of each the pump light applied to the optical fiber to apply each the pump light at each the power calculated.

In the preferred construction, a relational expression of a relation between the Raman gain and the total power of all the pump lights and of a relation between the Raman gain and the ratio coefficient of the each pump light is calculated, and power of each the pump light realizing the designated Raman gain G within the designated wavelength range is calculated by substituting the Raman gain G into the relational expression.

In another preferred construction, the number of wavelengths of the simultaneously applied pump lights is N wavelengths, coefficients A, $B_{\lambda n}$, $C_{\lambda n}$ (n=1, 2, ..., N) of the following expressions which represent the relations of the Raman gain G (dB) with the total power Pt(W) of all the pump lights and with the ratio coefficient $D_{\lambda n}$ of each the pump light λn (n=1, 2, ..., N) are calculated:

$Pt = A \times G$ $D_{\lambda n} = B_{\lambda n} \times G + C_{\lambda n}$ (n=1, 2, ..., N), and power $P_{\lambda n}(W)$ (n=1, 2, ..., N) of each the pump light λn realizing the designated Raman gain G (dB) within the designated wavelength range is calculated by substituting the Raman gain G (dB) into the following expression:

$P_{\lambda n} = A \times G \times (B_{\lambda n} \times G + C_{\lambda n})$ (n=1, 2, ... N).

In another preferred construction, the Raman gain in the designated wavelength range is controlled in an open loop.

According to the second aspect of the invention, a Raman gain control method of controlling a Raman gain caused by simultaneous application of pump lights of several wavelengths to an optical fiber, comprising the steps of based on a relation of a ratio coefficient which is a ratio of power of each the pump light to total power of all the pump lights with the Raman gain and a relation between the total power and the Raman gain, from a designated value of the Raman gain and a value of a gain inclination, calculating power of each the pump light by which a value of the Raman gain within a designated wavelength range realizes an inclination designated by the gain inclination centered around the designated value of the Raman gain, and controlling power of each the pump light applied to the optical fiber to apply each the pump light at each the power calculated.

In the preferred construction, a relational expression of a relation between the Raman gain and the total power of all the pump lights and of a relation between the Raman gain and the ratio coefficient of the each pump light is calculated, and power of each the pump light by which a value of the Raman gain within the designated wavelength range realizes an inclination designated by the gain inclination $\alpha$ (dB/Hz) centered around the designated value of the Raman gain G(dB) is calculated by substituting the Raman gain G (dB) and the gain inclination $\alpha$ (dB/Hz) into the relational expression.

In another preferred construction, the number of the simultaneously applied pump lights is N, coefficients A, $B_{\lambda,n}$, $C_{\lambda,n}$ (n=1, 2, ..., N) of the following expressions which represent the relations of the Raman gain G (dB) with the total power Pt(W) of all the pump lights and with the ratio coefficient $D_{\lambda,n}$ of each the pump light $\lambda n$ (n=1, 2, ..., N) are calculated:

$$Pt = A \times G$$

$$D_{\lambda,n} = B_{\lambda,n} \times G + C_{\lambda,n} \text{ (n=1, 2, ..., N), and}$$

power $P_{\lambda,n}$(W) (n=1, 2, ..., N) of each the pump light by which a value of the Raman gain within the designated wavelength range realizes an inclination designated by the gain inclination $\alpha$ (dB/Hz) centered around the designated value of the Raman gain G(dB) is calculated by substituting the Raman gain G (dB) and the gain inclination $\alpha$ (dB/Hz) into the following expression by using a predetermined coefficient E:

$$P_{\lambda,n} = A \times G \times (B_{\lambda,n} \times (G + E \times \alpha/G) + C_{\lambda,n}) \text{ (n=1, 2, ..., N).}$$

In another preferred construction, the Raman gain in the designated wavelength range is controlled in an open loop.

In another preferred construction, based on the designated value of the Raman gain and the value of the gain inclination, the Raman gain within the designated wavelength range and an inclination of the value are controlled in an open loop.

According to the third aspect of the invention, a Raman gain control method of controlling a Raman gain caused by simultaneous application of pump lights of several wavelengths to an optical fiber, comprising the steps of on a model transmission line, obtaining a value of each power of each the pump light realizing a designated Raman gain within a designated wavelength range, with respect to each of the model transmission line and a transmission line as an application destination, obtaining a value of Raman gain slope generated by application of each the pump light, with respect to each the pump light, calculating a value obtained by multiplying power of pump light in question realizing the desired Raman gain on the model transmission line by a ratio indicative of how many times the value of the Raman gain slope of the pump light in question on the model transmission line is the value of the Raman gain slope of the pump light in question on the transmission line as an application destination, and controlling power of each the pump light applied to the transmission line as an application destination to apply each the pump light at the power of each the calculated value, thereby realizing, on the transmission line as an application destination, the designated Raman gain the same as the gain of the model transmission line within the designated wavelength range.

In the preferred construction, the Raman gain in the designated wavelength range is controlled in an open loop.

According to another aspect of the invention, a Raman gain control method of controlling a Raman gain caused by simultaneous application of pump lights of several wavelengths to an optical fiber, comprising the steps of based on a relation of a ratio coefficient which is a ratio of power of each the pump light to total power of all the pump lights with the Raman gain and a relation between the total power and the Raman gain in a model transmission line, from a designated value of the Raman gain, calculating power of each the pump light realizing the designated Raman gain within a designated wavelength range, with respect to each of the model transmission line and a transmission line as an application destination, designating data of a value of Raman gain slope generated by application of each the pump light, with respect to each the pump light, calculating a value obtained by multiplying power of pump light in question realizing the desired Raman gain on the model transmission line by a ratio indicative of how many times the value of the Raman gain slope of the pump light in question on the model transmission line is the value of the Raman gain slope of the pump light in question on the transmission line as an application destination, and controlling power of each the pump light applied to the transmission line as an application destination to apply each the pump light at the power of each the calculated value, thereby realizing, on the transmission line as an application destination, the designated Raman gain within the designated wavelength range.

In the preferred construction, the Raman gain in the designated wavelength range is controlled in an open loop.

In another preferred construction, such that the Raman gain within the wavelength range has a necessary Raman gain value, a monitoring result and a target value are compared and a difference of the values is negatively fed back to control power of each the pump light in a closed loop.

According to another aspect of the invention, a Raman gain control method of controlling a Raman gain caused by simultaneous application of pump lights of several wavelengths to an optical fiber, comprising the steps of based on a relation of a ratio coefficient which is a ratio of power of each the pump light to total power of all the pump lights with the Raman gain and a relation between the total power and the Raman gain in a model transmission line, from a designated value of the Raman gain and a value of a gain inclination, calculating power of each the pump light by which a value of the Raman gain within a designated wavelength range realizes an inclination designated by the gain inclination centered around the designated value of the Raman gain, with respect to each of the model transmission line and a transmission line as an application destination, designating data of a value of Raman gain slope generated by application of each the pump light, with respect to each the pump light, calculating a value obtained by multiplying power of pump light in question realizing an inclination designated by the gain inclination centered around the designated value of the Raman gain on the model transmission line by a ratio indicative of how many times the value of the Raman gain slope of the pump light in question on the model transmission line is the value of the Raman gain slope of the pump light in question on the transmission line as an application destination, and controlling power of each the pump light applied to the transmission line as an application destination to apply each the pump light at the power of each the calculated value, thereby realizing, on the transmission line as an application destination, an inclination designated by the gain inclination centered around the designated value of the Raman gain within the wavelength range designated.

In the preferred construction, the Raman gain in the designated wavelength range is controlled in an open loop.

In another preferred construction, based on the designated value of the Raman gain and the value of the gain inclination, the Raman gain within the designated wavelength range and an inclination of the value are controlled in an open loop.

In another preferred construction, such that at least either the Raman gain within the wavelength range designated or an inclination of the value of the gain has a necessary Raman gain value or an inclination of the gain, a monitoring result and a target value are compared and a difference of the values is negatively fed back to control power of each the pump light in a closed loop.

According to another aspect of the invention, an optical fiber transmission system for transmitting signal light from a transmission terminal station to a reception terminal station through an optical fiber as a signal transmission line, comprises a gain control device provided at the transmission or reception terminal station or a repeater plant for controlling a Raman gain by simultaneous application of pump lights of several wavelengths, wherein the gain control device based on a relation of a ratio coefficient which is a ratio of power of each the pump light to total power of all the pump lights with the Raman gain and a relation between the total power and the Raman gain, from a designated value of the Raman gain, calculates power of each the pump light realizing the designated Raman gain within a designated wavelength range, and controls power of each the pump light applied to the optical fiber to apply each the pump light at each the power calculated.

According to another aspect of the invention, an optical fiber transmission system for transmitting signal light from a transmission terminal station to a reception terminal station through an optical fiber as a signal transmission line, comprises a gain control device provided at the transmission or reception terminal station or a repeater plant for controlling a Raman gain by simultaneous application of pump lights of several wavelengths, wherein the gain control device based on a relation of a ratio coefficient which is a ratio of power of each the pump light to total power of all the pump lights with the Raman gain and a relation between the total power and the Raman gain, from a designated value of the Raman gain and a value of a gain inclination, calculates power of each the pump light by which a value of the Raman gain within a designated wavelength range realizes an inclination designated by the gain inclination centered around the designated value of the Raman gain, and controls power of each the pump light applied to the optical fiber to apply each the pump light at each the power calculated.

According to another aspect of the invention, an optical fiber transmission system for transmitting signal light from a transmission terminal station to a reception terminal station through an optical fiber as a signal transmission line, comprises a gain control device provided at the transmission or reception terminal station or a repeater plant for controlling a Raman gain by simultaneous application of pump lights of several wavelengths, wherein the gain control device on a model transmission line, designates data of each power of each the pump light realizing a desired Raman gain within a designated wavelength range, with respect to each of the model transmission line and a transmission line as an application destination, designates data of a value of Raman gain slope generated by application of each the pump light, with respect to each the pump light, calculates a value obtained by multiplying power of pump light in question realizing the desired Raman gain on the model transmission line by a ratio indicative of how many times the value of the Raman gain slope of the pump light in question on the model transmission line is the value of the Raman gain slope of the pump light in question on the transmission line as an application destination, and controls power of each the pump light applied to the transmission line as an application destination to apply each the pump light at the power of each the calculated value, thereby realizing, on the transmission line as an application destination, the designated Raman gain the same as the gain of the model transmission line within the designated wavelength range.

According to another aspect of the invention, an optical fiber transmission system for transmitting signal light from a transmission terminal station to a reception terminal station through an optical fiber as a signal transmission line, comprises a gain control device provided at the transmission or reception terminal station or a repeater plant for controlling a Raman gain by simultaneous application of pump lights of several wavelengths, wherein the gain control device based on a relation of a ratio coefficient which is a ratio of power of each the pump light to total power of all the pump lights with the Raman gain and a relation between the total power and the Raman gain in a model transmission line, from a designated value of the Raman gain, calculates power of each the pump light realizing the designated Raman gain within a designated wavelength range, with respect to each of the model transmission line and a transmission line as an application destination, designates data of a value of Raman gain slope generated by application of each the pump light, with respect to each the pump light, calculates a value obtained by multiplying power of pump light in question realizing the desired Raman gain on the model transmission line by a ratio indicative of how many times the value of the Raman gain slope of the pump light in question on the model transmission line is the value of the Raman gain slope of the pump light in question on the transmission line as an application destination, and controls power of each the pump light applied to the transmission line as an application destination to apply each the pump light at the power of each the calculated value, thereby realizing, on the transmission line as an application destination, the designated Raman gain within the designated wavelength range.

According to another aspect of the invention, an optical fiber transmission system for transmitting signal light from a transmission terminal station to a reception terminal station through an optical fiber as a signal transmission line, comprises a gain control device provided at the transmission or reception terminal station or a repeater plant for controlling a Raman gain by simultaneous application of pump lights of several wavelengths, wherein the gain control device based on a relation of a ratio coefficient which is a ratio of power of each the pump light to total power of all the pump lights with the Raman gain and a relation between the total power and the Raman gain in a model transmission line, from a designated value of the Raman gain and a value of a gain inclination, calculates power of each the pump light by which a value of the Raman gain within a designated wavelength range realizes an inclination designated by the gain inclination centered around the designated value of the Raman gain, with respect to each of the model transmission line and a transmission line as an application destination, designates data of a value of Raman gain slope generated by application of each the pump light, with respect to each the pump light, calculates a value obtained by multiplying power of pump light in question realizing an inclination designated by the gain inclination centered around the designated value of the Raman gain on the model transmission line by a ratio indicative of how many times the value of the Raman gain slope of the pump light in question on the model transmission line is the value of the Raman gain slope of the pump light in question on the transmission line as an application destination, and controls power of each the pump light applied to the transmission line as an application destination to apply each the pump light at the power of each the calculated value, thereby realizing, on the transmission line as an application destination, an inclination designated by the gain inclination centered around the designated value of the Raman gain within the wavelength range designated.

According to another aspect of the invention, a Raman gain control device for controlling a Raman gain caused by simultaneous application of pump lights of several wavelengths to an optical fiber, comprises means for calculating, based on a relation of a ratio coefficient which is a ratio of power of each the pump light to total power of all the pump lights with the Raman gain and a relation between the total power and the Raman gain, from a designated value of the Raman gain, power of each the pump light realizing the designated Raman gain within a designated wavelength range, and means for controlling power of each the pump light applied to the optical fiber to apply each the pump light at each the power calculated.

According to another aspect of the invention, a Raman gain control device for controlling a Raman gain caused by simultaneous application of pump lights of several wavelengths to an optical fiber, comprises means for calculating, based on a relation of a ratio coefficient which is a ratio of power of each the pump light to total power of all the pump lights with the Raman gain and a relation between the total power and the Raman gain, from a designated value of the Raman gain and a value of a gain inclination, power of each the pump light by which a value of the Raman gain within a designated wavelength range realizes an inclination designated by the gain inclination centered around the designated value of the Raman gain, and means for controlling power of each the pump light applied to the optical fiber to apply each the pump light at each the power calculated.

According to another aspect of the invention, a Raman gain control device for controlling a Raman gain caused by simultaneous application of pump lights of several wavelengths to an optical fiber, comprises means for designating, on a model transmission line, data of each power of each the pump light realizing a desired Raman gain within a designated wavelength range, means for designating, with respect to each of the model transmission line and a transmission line as an application destination, data of a value of Raman gain slope generated by application of each the pump light, means for calculating, with respect to each the pump light, a value obtained by multiplying power of pump light in question realizing the desired Raman gain on the model transmission line by a ratio indicative of how many times the value of the Raman gain slope of the pump light in question on the model transmission line is the value of the Raman gain slope of the pump light in question on the transmission line as an application destination, and means for controlling power of each the pump light applied to the transmission line as an application destination to apply each the pump light at the power of each the calculated value, thereby realizing, on the transmission line as an application destination, the desired Raman gain the same as the gain of the model transmission line within the designated wavelength range.

According to a further aspect of the invention, a Raman gain control device for controlling a Raman gain caused by simultaneous application of pump lights of several wavelengths to an optical fiber, comprises means for calculating, based on a relation of a ratio coefficient which is a ratio of power of each the pump light to total power of all the pump lights with the Raman gain and a relation between the total power and the Raman gain in a model transmission line, from a designated value of the Raman gain, power of each the pump light realizing the designated Raman gain within a designated wavelength range, means for designating, with respect to each of the model transmission line and a transmission line as an application destination, data of a value of Raman gain slope generated by application of each the pump light, means for calculating, with respect to each the pump light, a value obtained by multiplying power of pump light in question realizing the desired Raman gain on the model transmission line by a ratio indicative of how many times the value of the Raman gain slope of the pump light in question on the model transmission line is the value of the Raman gain slope of the pump light in question on the transmission line as an application destination, and means for controlling power of each the pump light applied to the transmission line as an application destination to apply each the pump light at the power of each the calculated value, thereby realizing, on the transmission line as an application destination, the designated Raman gain within the designated wavelength range.

According to a still further aspect of the invention, a Raman gain control device for controlling a Raman gain caused by simultaneous application of pump lights of several wavelengths to an optical fiber, comprises means for calculating, based on a relation of a ratio coefficient which is a ratio of power of each the pump light to total power of all the pump lights with the Raman gain and a relation between the total power and the Raman gain in a model transmission line, from a designated value of the Raman gain and a value of a gain inclination, power of each the pump light by which a value of the Raman gain within a designated wavelength range realizes an inclination designated by the gain inclination centered around the designated value of the Raman gain, means for designating, with respect to each of the model transmission line and a transmission line as an application destination, data of a value of Raman gain slope generated by application of each the pump light, means for calculating, with respect to each the pump light, a value obtained by multiplying power of pump light in question realizing an inclination designated by the gain inclination centered around the designated value of the Raman gain on the model transmission line by a ratio indicative of how many times the value of the Raman gain slope of the pump light in question on the model transmission line is the value of the Raman gain slope of the pump light in question on the transmission line as an application destination, and means for controlling power of each the pump light applied to the transmission line as an application destination to apply each the pump light at the power of each the calculated value, thereby realizing, on the transmission line as an application destination, an inclination designated by the gain inclination centered around the designated value of the Raman gain within the wavelength range designated.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First, with respect to a first invention, principles and contents will be described with reference to the drawings.

Conventional problem is that even if conditions of power of pump light for realizing a composite gain profile flat at a certain gain level (Raman gain) are obtained by trial and error, there exists no method of varying a gain level with ease while maintaining the composite gain profile to be flat. The present invention provides a method which solve the problem. Procedure of the method is as follows.

1. In a certain transmission line, form a composite gain profile flat at several stages of gain levels G by one method or another such as trial and error and obtain a coefficient of a proportional relation between power $P_{\lambda n}$ of pump light and the amount G of gain (gain level) at that time.

2. Also at an amount G of gain yet to be measured, the gain can be varied regardless of stages by the pump with power $P_{\lambda n}(W)$ of pump light obtained from the proportional relation while maintaining the flat composite gain profile.

The principle is as follows.

Figure 15:
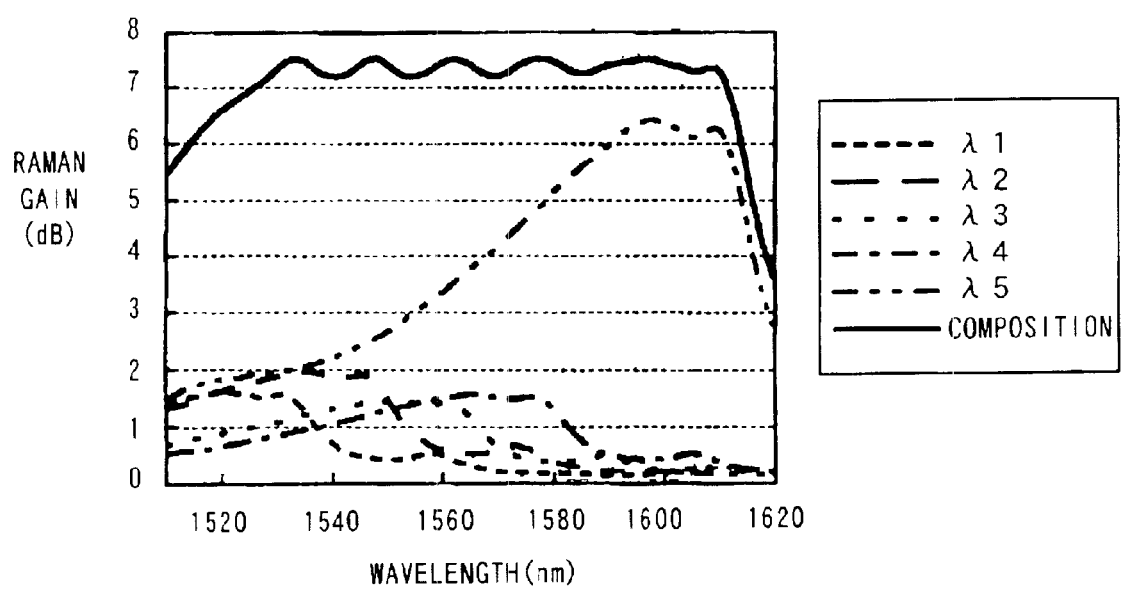
FIG. 15 is a diagram for use in explaining a composite Raman gain profile.

Consider a case as shown in FIG. 15 where a flat composite Raman gain profile is formed with the amount of gain denoted as G(dB). In the following, denote power of each pump light having an pump wavelength λn (n=1, 2, . . . the number of pump wavelengths) as $P_{\lambda n}$ (W) and denote a total of powers of pump lights (hereinafter referred to as total power of pump light) as $P_t(W)$. A ratio of power of pump light having a wavelength λn to the total power of pump light is denoted as $D_{\lambda n}$. In other words, the following expression holds:

$$P_{\lambda n}=D_{\lambda n}\times P_t \qquad \text{(Expression 1)}.$$

Since $D_{\lambda,n}$ is a value determining with which ratio the power of each pump light is combined, it will be hereinafter referred to as a ratio coefficient.

Figure 16:
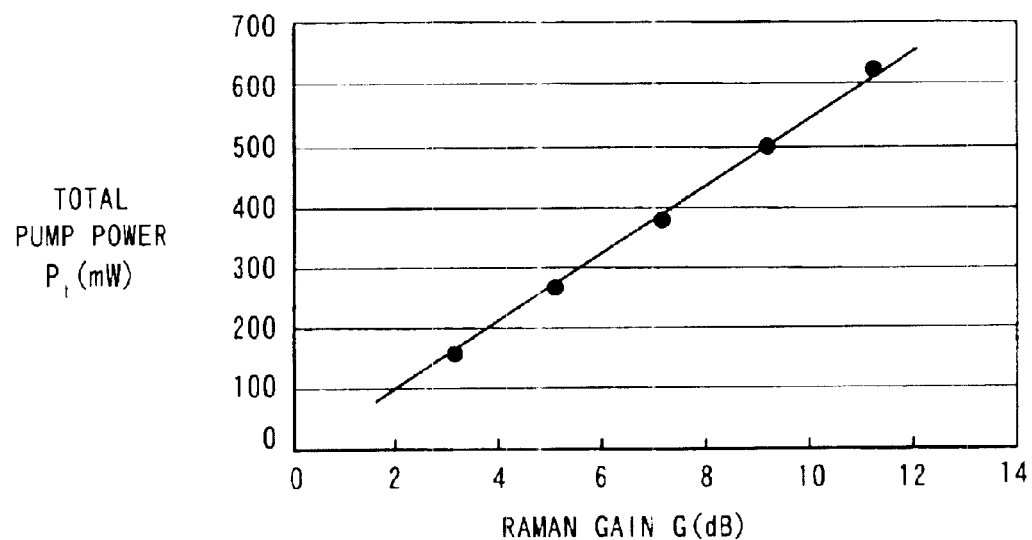
FIG. 16 is a diagram showing an example of a correlation between the amount G of gain and total power $P_t$ of pump light obtained when a flat Raman gain profile is formed.
Figure 17:
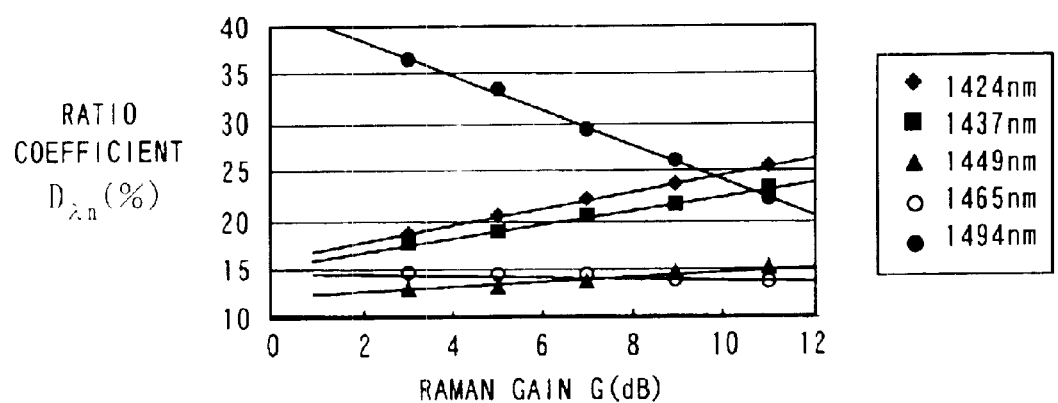
FIG. 17 is a diagram showing an example of a correlation between the amount G of gain and a ratio coefficient $D_{\lambda n}$ obtained when a flat Raman gain profile is formed.
Figure 18:
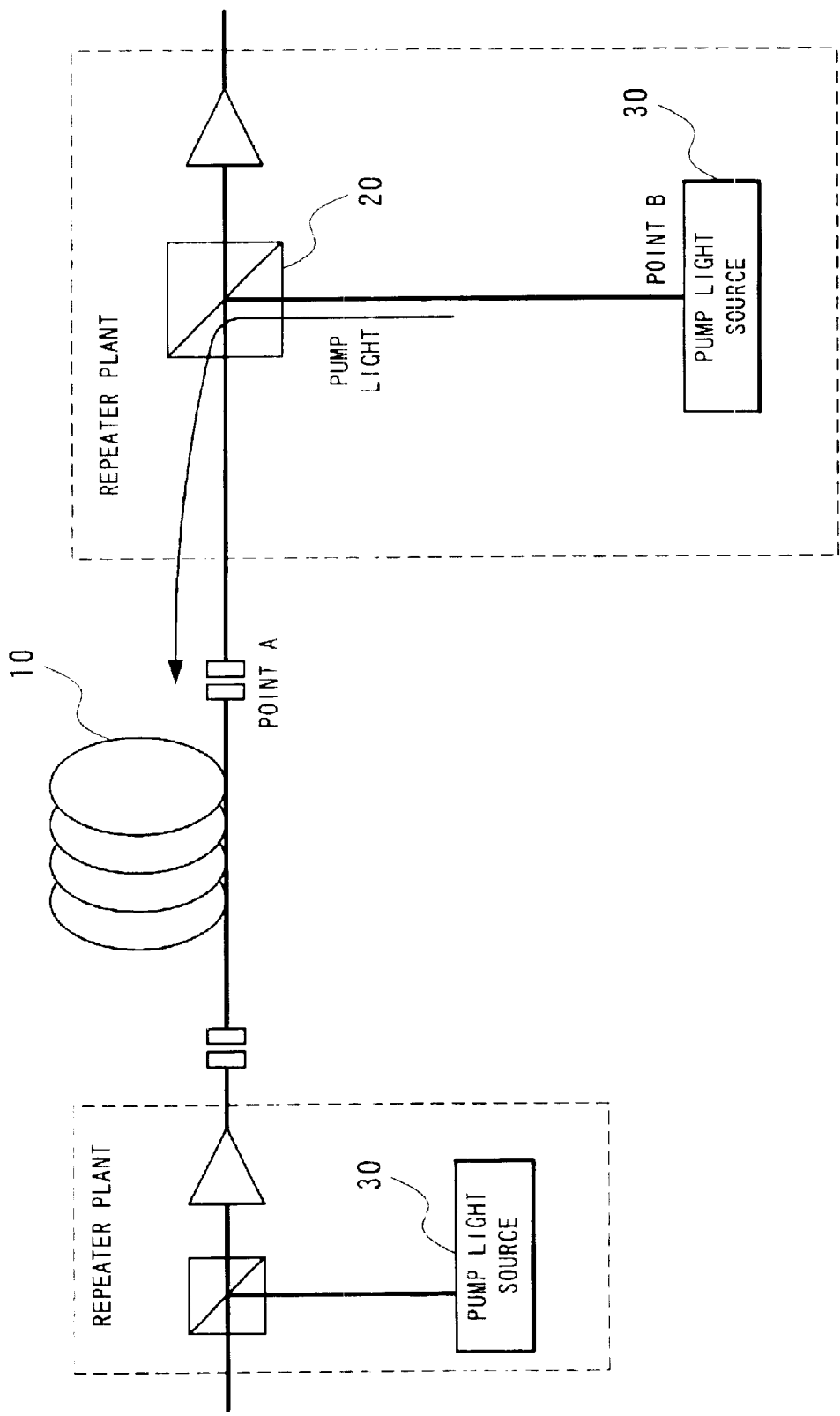
FIG. 18 is a diagram for use in explaining a relation between arrangement of Raman amplification and Raman gain slope.

Relation between "amount G of gain" vs. "ratio coefficient $D_{\lambda,n}$" and "amount G of gain" vs. "total power $P_t$ of pump light" in a case where a five wavelengths pump Raman gain profile (pump light wavelength: 1424 nm, 1437 nm, 1449 nm, 1465 nm, 1494 nm) flat at bandwidths from 1530 nm to 1565 nm and from 1575 nm to 1610 nm is formed in a single mode fiber (SMF) are shown in FIGS. 16 and 17. These relations are obtained by finding a combination of $P_{\lambda,1}$ to $P_{\lambda,5}$ by which a gain profile flat at G of 3, 5, 7, 9 and 11 dB can be obtained by trial and error. As can be seen from FIGS. 16 and 17, "amount G of gain" vs. "ratio coefficient $D_{\lambda,n}$" and "amount G of gain" vs. "total power $P_t$ of pump light" each have a proportional relation.

In addition, as reported in the literature set forth below, calculation simulation for numerically solving a differential equation also confirms that "amount G of gain" vs. "ratio coefficient $D_{\lambda,n}$" and "amount G of gain" vs. "total power of pump light $P_t$" each have a proportional relation.

Literature: H. Kidrof, K. Rottwitt, M. Nissov, M. Ma, and E. Rabarijaona, "Pump Interactions in a 100-nm Bandwidth Raman Amplifier", IEEE Photon. Technol. Lett., 11, (5), pp. 530–532, 1999.

The numerical simulation employs the following Expression 2.

$$\frac{dP_f(z,v)}{dz} = -\alpha(v) \times P_f(z,v) + \int_{\zeta > v} \frac{g_r}{A_{eff}}(v-\zeta) \times \{P_f(z,\zeta) + P_b(z,\zeta)\} \times P_f(z,v) d\zeta - \int_{\zeta < v} \frac{g_r}{A_{eff}}(v-\zeta) \times \{P_f(z,\zeta) + P_b(z,\zeta)\} \times P_f(z,v) d\zeta$$ (Expression 2)

in which $P_f$ and $P_b$ denote powers of forward direction and backward direction lights, respectively. z represents a position in a fiber and v represents a noted optical frequency. $\alpha$, $g_r$ and $A_{eff}$ represent a loss, a Raman gain coefficient and an effective core area of a fiber, respectively.

It is accordingly found that "amount G of gain" vs. "ratio coefficient $D_{\lambda,n}$" and "amount G of gain" vs. "total power of pump light $P_t$" can be generally expressed as follows, respectively:

$P_t = A \times G$ Expression 3

$D_{\lambda,n} = B_{\lambda,n} \times G + C_{\lambda,n}$ Expression 4 in which A, $B_{\lambda,n}$, $C_{\lambda,n}$ denote coefficients inherent to each fiber including a difference in a kind of fiber and an individual. The following expression can be obtained from Expressions 1, 3 and 4:

$P_{\lambda,n} = A \times G \times (B_{\lambda,n} \times G + C_{\lambda,n})$ Expression 5.

Accordingly, with the coefficients A, $B_{\lambda,n}$ and $C_{\lambda,n}$ obtained in advance, power of pump light of each wavelength necessary for forming a composite Raman gain profile flat at various amounts of gains can be determined from one input parameter G.

In the following, a first embodiment to which the first invention is applied will be described.

In brief, the present invention aims at providing a technique of varying a gain level while maintaining a gain profile, which includes forming a composite gain profile flat at several stages of gain levels G by trial and error, obtaining a proportional relation between power $P_{\lambda,n}$ of pump light of each pump wavelength and a gain level G at that time and reversely calculating power $P_{\lambda,n}$ of pump light from the proportional relation at an arbitrary gain level G to vary a gain while maintaining the flat composite gain profile.

Figure 1:
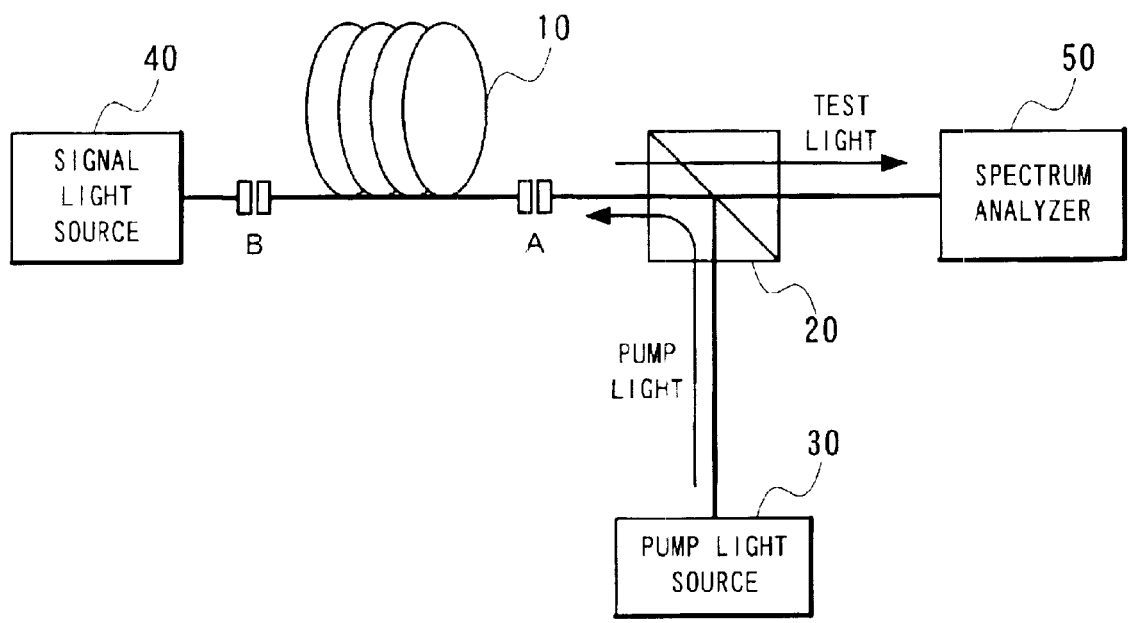
FIG. 1 is a diagram for use in explaining a structure of an optical fiber transmission system according to a first invention.

Structural diagram of the present invention is shown in FIG. 1. In the following embodiment, description will be made of a mode of backward pump distributed Raman amplification. To one end of a transmission line fiber 10 as a Raman amplification medium, a signal light source 40 is connected and to the other end, a Raman pump light source 30 is connected. The end point to which the pump light source 30 is connected will be referred to as a point A and the end point to which the signal light source 40 is connected will be referred to as a point B. Direction of application from the end B to the transmission line fiber 10 will be referred to as a forward direction and a direction of application from the end A to the transmission fiber 10 as a backward direction. Furthermore, a wavelength band subjected to Raman amplification by pump light will be referred to as a signal wavelength band.

To the end A, a WDM coupler 20 is connected for multiplexing and demultiplexing an pump wavelength band and a signal wavelength band. To an pump wavelength band port of the WDM coupler 20, the pump light source 30 is connected and to a signal wavelength band port, an optical spectrum analyzer 50 is connected. The pump light is assumed to have five wavelengths $\lambda_1$ to $\lambda_5$ of 1424 nm, 1437 nm, 1449 nm, 1465 nm and 1494 nm, respectively, and among the signal wavelength band, 1530.3 to 1562.2 nm and 1574.5 to 1608.3 nm are assumed to be wavelength bands requiring a flat gain. The signal light source 40 connected to the end B is an WDM light source having a total of 80 waves including 40 waves arranged at intervals of 100 GHz between 1530.3 and 1562.2 nm and 40 waves arranged at intervals of 100 GHz between 1574.5 and 1608.3 nm. Used as the transmission line fiber 10 is an 80 km SMF.

In the present embodiment, a gain profile is measured by the following manner. First, with no pump light output, sweep the optical spectrum analyzer 50 from a short wave end to a long wave end of the signal light wavelength band to obtain a first WDM signal spectrum (1) after the transmission. Furthermore, with a Raman gain generated in the transmission fiber by outputting pump light, sweep the optical spectrum analyzer to obtain a second WDM signal spectrum (2). By subtracting the first spectrum (1) from the second spectrum (2), a Raman gain profile of a wavelength band in which the WDM signal light exists is obtained.

Next, procedures of the present embodiment will be described.

Figure 2:
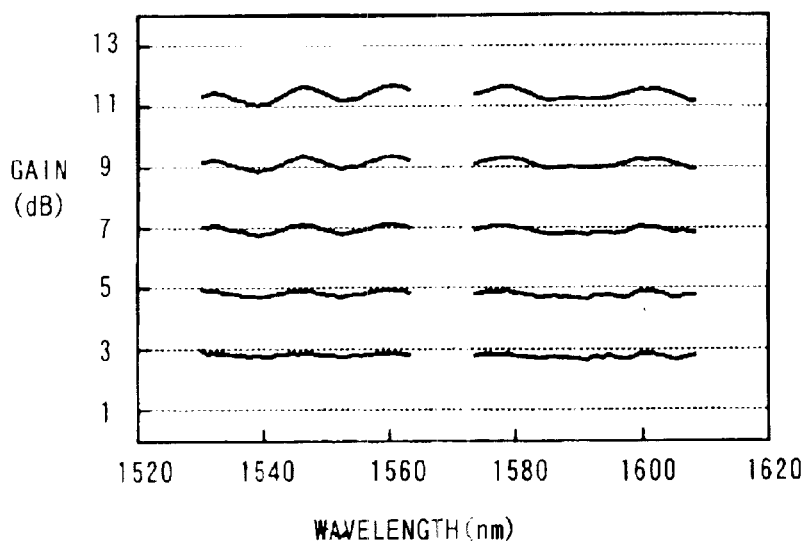
FIG. 2 is a diagram for use in explaining a gain profile obtained by a first embodiment according to the first invention.

First, form a composite gain profile flat at several gain levels G by trial and error to record the then power $P_{\lambda,n}$ of the pump light. More specifically, in order to obtain a flat composite gain profile, measure a gain profile while adjusting power of the pump light of each wavelength, again measure a gain profile while adjusting power of the pump light of each wavelength based on the measurement result and repeat this trial and error. This processing will be hereinafter referred to as manual optimization of power of pump light. The composite gain profile obtained as a result of the optimization is shown in FIG. 2.

Each power of pump light obtained by manual optimization of the power of the pump light at gain level G of 3, 5, 7, 9, 11 dB is shown in Table 1. Graphs of the same are shown in FIGS. 16 and 17. FIG. 16 illustrates a change of total power $P_t$ of pump light with respect to the gain level G, while FIG. 17 shows a state of change of power $P_{\lambda n}$ of pump light of each pump wavelength with respect to the gain level G.

Since a proportional relation thus appears clearly, each of the coefficients A, $B_{\lambda n}$ and $C_{\lambda n}$ in Expressions 3 and 4 is determined by the fitting into a linear function as shown in Table 2:

TABLE 1

| GAIN (dB) | $\lambda_1$ | $\lambda_2$ | $\lambda_3$ | $\lambda_4$ | $\lambda_5$ | TOTAL |
|---|---|---|---|---|---|---|
| 3 | 29 | 28 | 21 | 23 | 58 | 159 |
| 5 | 54 | 50 | 36 | 39 | 90 | 269 |
| 7 | 84 | 78 | 53 | 55 | 112 | 382 |
| 9 | 117 | 108 | 73 | 70 | 130 | 498 |
| 11 | 156 | 144 | 94 | 86 | 138 | 618 |

(UNIT: mW)

TABLE 2

| PUMP WAVELENGTH (nm) | $\lambda_1$ | $\lambda_2$ | $\lambda_3$ | $\lambda_4$ | $\lambda_5$ |
|---|---|---|---|---|---|
| A | | | 0.0554 | | |
| $B_{\lambda n}$ | 0.8714 | 0.7241 | 0.2641 | −0.0771 | −1.7824 |
| $C_{\lambda n}$ | 15.708 | 15.252 | 12.218 | 14.806 | 42.015 |

Based on the above-described tables, pump by $P_{\lambda n}$ obtained by applying the gain level G to Expression 5 results in obtaining a constantly flat composite gain profile. In other words, gain can be varied regardless of stages while maintaining flatness.

Figure 3:
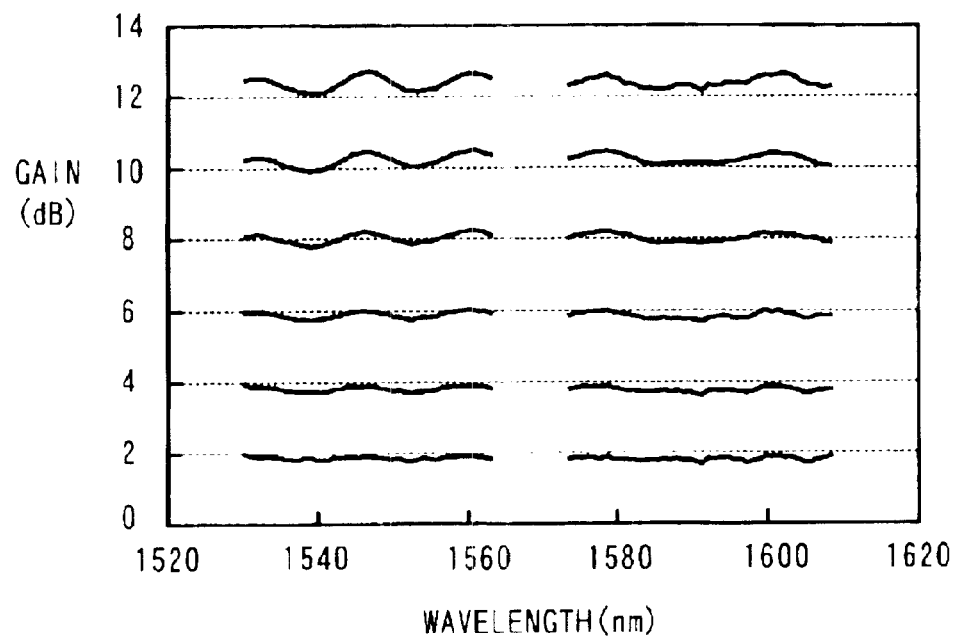
FIG. 3 is a diagram showing a gain profile obtained by the first embodiment according to the first invention.

More specifically, shown in FIG. 3 is a composite Raman gain profile obtained by the pump with power $P_{\lambda n}$ of pump light (see Table 3) obtained by applying gain levels G of 2, 4, 6, 8, 10 and 12 dB which are different from those obtained in manual optimization to Expression 5. Substantially ideally optimized flat gain profile can be thus obtained without trial and error.

TABLE 3

| GAIN (dB) | $\lambda_1$ | $\lambda_2$ | $\lambda_3$ | $\lambda_4$ | $\lambda_5$ | TOTAL |
|---|---|---|---|---|---|---|
| 2 | 19 | 18 | 14 | 16 | 43 | 111 |
| 4 | 42 | 40 | 29 | 32 | 77 | 221 |
| 6 | 70 | 65 | 46 | 48 | 104 | 332 |
| 8 | 100 | 93 | 63 | 63 | 123 | 443 |
| 10 | 135 | 125 | 82 | 78 | 134 | 554 |
| 12 | 174 | 159 | 102 | 92 | 137 | 664 |

(UNIT: mW)

The present invention intends to provide a method of obtaining a function of outputting optimized power of pump lights having five pump wavelengths only by applying one parameter, a gain level G. Use of the function enables optimized power of pump light necessary for generating a desired gain level to be obtained in an open loop.

Although described in the present embodiment is an example of expanding and shrinking a flat gain profile in a direction of a gain, the present invention is also applicable to a case of expanding and shrinking not only a flat gain profile but also a gain profile of a certain configuration in the direction of a gain.

Next, description will be made of principles and contents of a method of varying a gain inclination which is a second invention.

It has conventionally been a problem that even when conditions of power of pump light for realizing a composite gain profile flat at a certain gain level are obtained by trial and error, no method exists of causing the gain to have a straight inclination with ease. In other words, when signal light is applied with its level inclined, the present invention provides a method which solves the problem. Its procedure is as follows.

1. In the first invention, further varying G indicative of an SRS tilt level between pump lights leads to varying a gain inclination of a composite gain profile.

Its principle is as follows.

When increasing or decreasing a gain while forming a flat composite Raman gain profile, such a proportional relation as shown in Expression 4 holds between an amount G of gain and a ratio coefficient $D_{\lambda n}$. Such change of ratio is derived from generation of a power tilt caused by stimulated Raman scattering (SRS) generated between respective pump wavelengths. Assuming here that the abscissas G in FIGS. 2 and 3 represent not a real Raman gain G but a parameter controlling a tilt generated between pump wavelengths, a composite Raman gain profile having a straight inclination can be formed by adjusting this parameter irrespective of the real Raman gain G.

More specifically, replace the latter G in Expression 5 by G+E×α/G to obtain Expression 6:

$$P_{\lambda n}=A\times G\times[B_{\lambda n}\times(G+E\times\alpha/G)+C_{\lambda n}] \qquad \text{Expression 6.}$$

α here represents a gain inclination (dB/THz) and E represents a coefficient determined by a line.

In Expression 6, assuming α<0, power of pump light of each wavelength can be obtained necessary for forming a composite Raman gain profile having a positive inclination relative to a direction of a wavelength and assuming α>0, that necessary for forming a composite Raman gain profile having a negative inclination relative to the direction of wavelength can be obtained.

Thus, power of each pump light necessary for forming a composite Raman gain profile having a straight inclination at various gains can be determined according to two input parameters, a gain level G and a gain inclination α.

Second embodiment to which the second invention is applied will be described in the following.

In brief, an object of the present embodiment is to provide a method of generating a straight inclination in a composite gain profile with ease, which enables a gain inclination of a composite gain profile to be varied by further varying G indicative of an SRS tilt level between pump lights in the first invention.

For the purpose of simplification of description, the present embodiment is implemented as a development of the first embodiment. The same transmission line, pump wavelength and signal wavelength band are used. The coefficients A, $B_{\lambda n}$ and $C_{\lambda n}$ are accordingly the same as those shown in Table 2 of the first embodiment. It is clearly understood that even if totally different transmission line, pump wavelength and signal band are used, the present invention can be realized without any problem.

Only by varying an amount G of gain and an inclination α of a gain as two parameters in Expression 6, power of pump light of each pump wavelength necessary for forming a composite Raman gain profile having a straight inclination at various gains can be obtained. In the present embodiment, with a gain G being about 10 dB, straight inclinations of ±2 dB and ±4 dB are formed from end to end of the signal band. The signal band expressed in frequency ranges from 195.90 THz to 186.40 THz with a difference of about −9.5 THz.

Figure 4:
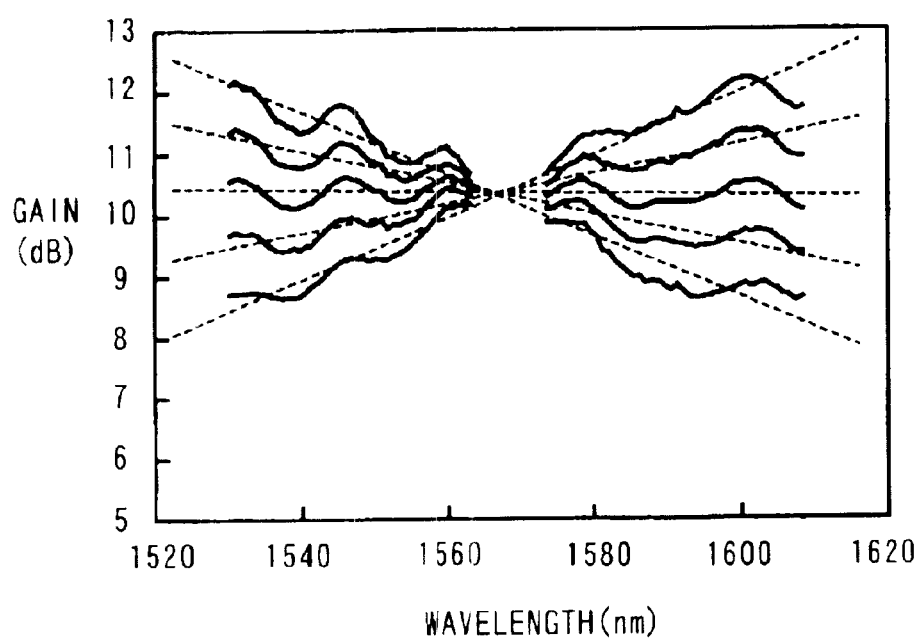
FIG. 4 is a gain profile obtained by a second embodiment according to a second invention.

With an inclination, for example, of 2 dB from the short wave side toward the long wave side, the inclination of the gain is accordingly expressed as +2 (dB)/−9.5 (THz)=−0.211 (dB/THz). Power of pump light then is shown in Table 4 and a composite Raman gain profile is shown in FIG. 4.

TABLE 4

| GAIN INCLINATION (dB/SIGNAL BAND) | $\lambda_1$ | $\lambda_2$ | $\lambda_3$ | $\lambda_4$ | $\lambda_5$ | TOTAL |
|---|---|---|---|---|---|---|
| −4 | 161 | 146 | 90 | 75 | 82 | 554 |
| −2 | 148 | 136 | 86 | 77 | 107 | 554 |
| 0 | 135 | 125 | 82 | 78 | 134 | 554 |
| 2 | 120 | 111 | 77 | 79 | 166 | 554 |
| 4 | 99 | 94 | 71 | 81 | 208 | 554 |

(UNIT: mW)

That the gain form deviates from a straight line particularly on the long wave side exhibits limitation derived from the number of pump wavelengths being limited to five and even by manual adjustment by trial and error, there is substantially no room for further approximating the form to a straight line. In other words, an SRS tilt between pump wavelengths has been compensated for by the present algorithm as much as possible.

Figure 5:
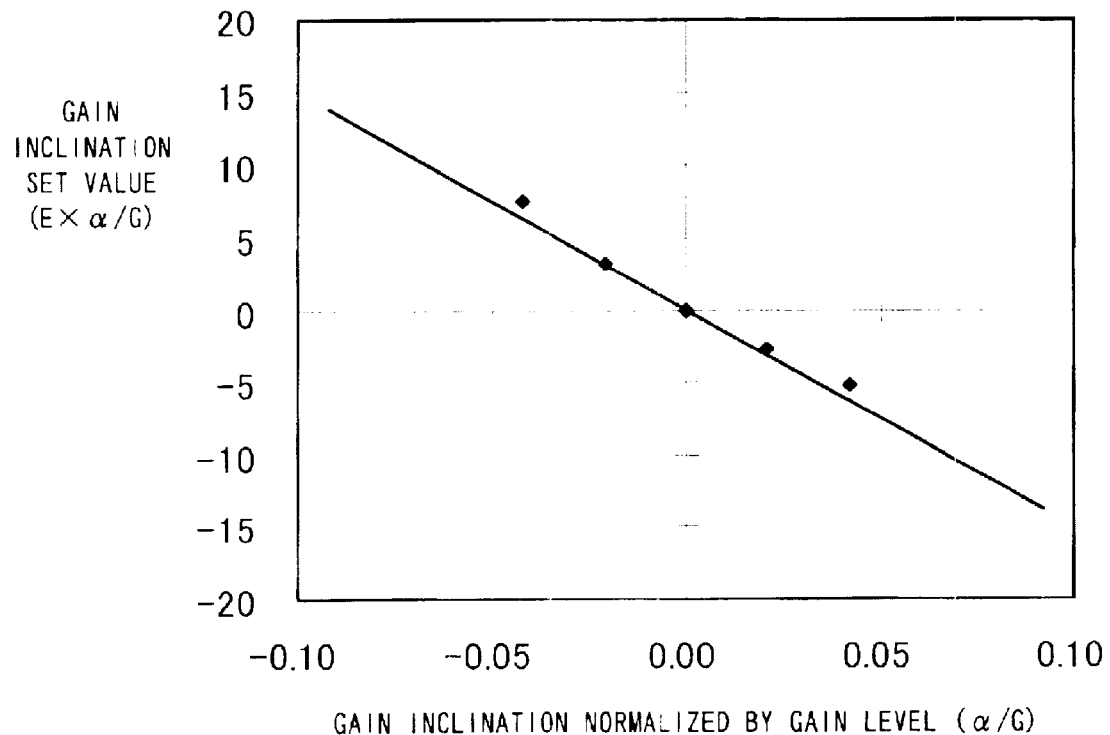
FIG. 5 is a diagram showing a relationship between a gain inclination set value α and an actual amount of generated gain when an arbitrary gain inclination is formed according to the second invention.

Shown in FIG. 5 is a relation between a gain inclination (α/G) obtained by quantifying a gain inclination by fitting the gain profile obtained into a linear function and normalizing the same by the gain level G in FIG. 4 and a gain inclination set value (E×α/G). Here, a gain inclination a is expressed in (dB/THz). When an absolute value of the gain inclination α is increased, the relation seems to deviate from a proportional relation, which is because of constraint by the number of pump lights being five. The gain inclination obtained by normalization by a gain level G and the gain inclination set value thus have a substantially proportional relation. Proportional coefficient of the relation is E in Expression 6, which is determined to be −149.6 in the present embodiment.

Checking the proportional coefficient E in advance enables an arbitrary gain inclination state to be obtained in an open loop.

Next, description will be made of a method of reproducing a gain profile in a model transmission line which is a third invention on other transmission line.

It has conventionally been a problem that there is no simple method of realizing conditions of power of pump light for realizing a certain composite gain profile obtained on a model transmission line by trial and error on a transmission line whose Raman amplification characteristics are unknown. The present invention provides a method which solves the problem. Procedure of the method is as follows.

Preparation: Measure gain slope $\Gamma^m_{\lambda n}$ at each pump wavelength on a model transmission line and record the same. In addition, form a composite gain profile flat at a desired gain level by one method or another such as trial and error and record $P_{\lambda n}$ then.

1. Measure gain slope $\Gamma^t_{\lambda n}$ of a transmission line whose Raman amplification characteristics are unknown and multiply $P_{\lambda n}$ by its ratio ($\Gamma^m_{\lambda n}/\Gamma^t_{\lambda n}$) to excite the transmission line.

2. The same composite gain profile as that of the model transmission line is reproduced.

Its principle is as follows.

In the following, a transmission line whose Raman amplification characteristics are unknown and to which distributed Raman amplification is to be actually applied will be referred to as a real transmission line.

Assume here that Raman gain profiles of the model transmission line and the real transmission line are substantially similar in a direction of a gain. In practice, Raman gain profiles in optical fibers formed of quartz glass are substantially overlapped with each other when multiplied by several times the coefficient in the direction of a gain. In some of fibers added with a large amount of $GeO_2$ or other fiber, its Raman gain profile has a larger variation than that of a fiber for use in a transmission line. In such a case, a flat gain can not be obtained by adjustment of only power of pump light of each pump wavelength, so that procedure should be started over with optimization of an pump wavelength. The present invention aims at providing a method of automatically optimizing power of pump light within a difference in fibers to an extent that enough gain flatness can be obtained only by adjustment of power of pump light without changing an pump wavelength.

With respect to the model transmission line, assume Raman gain slope obtained at a signal wavelength λ when excited by an pump wavelength λn to be $\Gamma^m_{\lambda n}(\lambda)(dB/W)$. Similarly, assume that of the real transmission line to be $\Gamma^t_{\lambda n}(\lambda) (dB/W)$.

Assume a single wavelength pump Raman gain profile obtained when pump light of a certain wavelength λn is applied to the model transmission line at power of $p^m(W)$ to be $\phi_{\lambda n}(p^m, \lambda n)$. Pump light power $p^t(W)$ of a wavelength λn necessary for generating the same single wavelength pump Raman gain profile on the real transmission line is $\Gamma^m_{\lambda n}/\Gamma^t_{\lambda n}$ times $p^m$.

Description will be next made of a case of a composite Raman gain profile. What determines a form of a composite Raman gain profile is not power of each pump wavelength but a form of a single wavelength pump Raman gain profile that each pump wavelength generates. Accordingly, when a form of a single wavelength pump Raman gain profile generated by each pump wavelength is the same, an obtained composite Raman gain profile will have the same form.

When a certain composite Raman gain profile is obtained at the model transmission line and power of each pump wavelength then is known, reproduction of the composite Raman gain profile on the real transmission line can be realized by multiplying the power of each pump wavelength by $\Gamma^m_{\lambda n}/\Gamma^t_{\lambda n}$.

Third embodiment of a third invention will be described in the following.

In brief, an object of the third invention is to provide a method of reproducing a gain profile of a model transmission line on other transmission line, which includes measuring gain slope $\Gamma^m_{\lambda n}$ on the model transmission line, measuring gain slope $\Gamma^t_{\lambda n}$ of a transmission line whose Raman amplification characteristics are unknown, multiplying $P_{\lambda n}$ by its ratio ($\Gamma^m_{\lambda n}/\Gamma^t_{\lambda n}$) to excite a transmission line fiber, thereby reproducing the same composite gain profile as that of the model transmission line.

Procedure is as follows.

Preparation: Form a certain composite gain profile on the model transmission line to record $P_{\lambda n}$ then and also measure gain slope $\Gamma^m_{\lambda n}$.

1. Measure gain slope $\Gamma^t_{\lambda n}$ of a transmission line whose Raman amplification characteristics are unknown and multiply $P_{\lambda n}$ of the model transmission line by its ratio ($\Gamma^m_{\lambda n}/\Gamma^t_{\lambda n}$) to excite the transmission line.

2. The same composite gain profile as that of the model transmission line is reproduced.

For the purpose of simplification description, the present embodiment is implemented as a development of the first embodiment. More specifically, as the model transmission line, a transmission line formed of SMF 80 km is used. In addition, the same pump wavelength and signal wavelength band are used. The coefficients A, $B_{\lambda n}$ and $C_{\lambda n}$ are accordingly the same as those shown in Table 2 of the first embodiment. It is clearly understood that even if a totally different transmission line is used as the model transmission line, or other pump wavelength and signal band are used, the present invention can be realized without any problem. Used as a transmission line whose Raman amplification characteristics are unknown is an 80 km NZ-DSF.

Results of measurement of Raman gain efficiencies $\Gamma^m_{\lambda n}$ and $\Gamma^t_{\lambda n}$ of these transmission lines are shown in Table 5.

TABLE 5

| | $\lambda_1$ | $\lambda_2$ | $\lambda_3$ | $\lambda_4$ | $\lambda_5$ |
|---|---|---|---|---|---|
| $\Gamma^m_{\lambda n}$ (MODEL TRANSMISSION LINE) | 33.31 | 33.81 | 34.29 | 35.16 | 37.07 |
| $\Gamma^t_{\lambda n}$ (UNKNOWN TRANSMISSION LINE) | 49.23 | 49.80 | 50.58 | 52.30 | 55.37 |
| $\Gamma^m_{\lambda n}/\Gamma^t_{\lambda n}$ (RATIO) | 0.6766 | 0.6789 | 0.6779 | 0.6723 | 0.6694 |

(UNIT: dB/W)

Raman gain slope $\Gamma_{\lambda n}$ defined at a Raman gain peak wavelength of each pump wavelength can be measured, for example, by conventional art disclosed in Japanese Patent Laying-Open (Kokai) No. 2001-007768.

Figure 6:
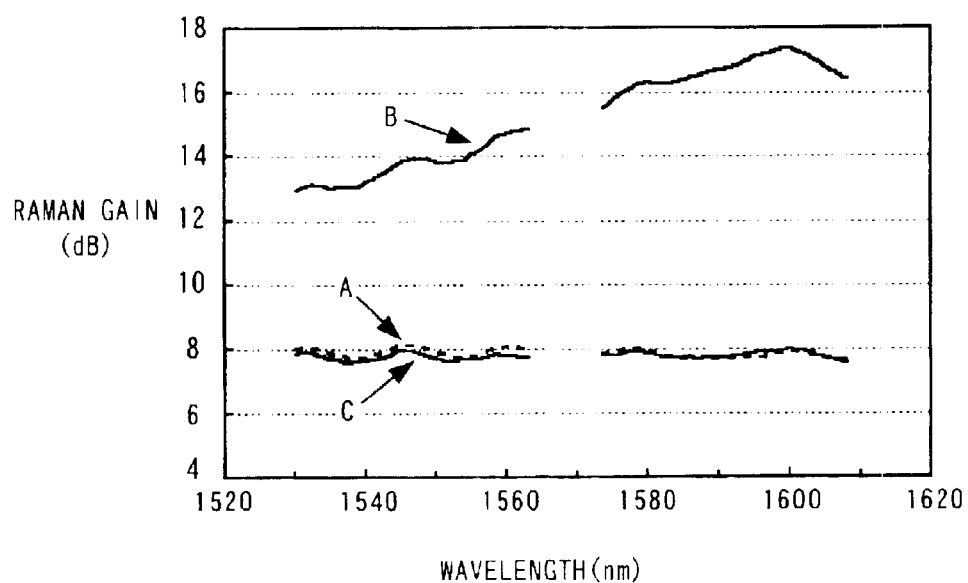
FIG. 6 is a diagram for use in explaining a result obtained by a third embodiment according to a third invention.

First, power of pump light on the model transmission line as of formation of a gain profile whose gain is flat and gain level G is 8 dB (curve A in FIG. 6) is expressed in a row of 8 dB in Table 3. Then, the NZ-DSF is excited by completely the same pump light power to obtain a curve B in FIG. 6. As illustrated in the figure, a large gain inclination is generated and an average gain largely deviates from a desired value. Lastly, when the power of each pump wavelength is multiplied by $\Gamma^m_{\lambda n}/\Gamma^t_{\lambda n}$ as shown in Table 5 to excite the NZ-DSF, a curve C in FIG. 6 is obtained, which is substantially coincident with the curve A.

A composite gain profile on the model transmission line can be thus reproduced on the NZ-DSF neither with trial nor error.

Next, description will be made of principles and contents of a method of varying a gain level while maintaining a gain profile in an arbitrary fiber which is a fourth invention.

The fourth invention is an application of the third invention to the first invention. More specifically, even in a transmission line fiber whose Raman amplification characteristics are unknown, by exciting the transmission line at a gain slope ratio ($\Gamma^m_{\lambda n}/\Gamma^t_{\lambda n}$) of the model transmission line to the path in question, the same function of varying a composite gain profile as that of the model transmission line can be reproduced. In other words, the gain can be varied regardless of stages while maintaining a flat composite gain profile.

Fourth embodiment of the fourth invention will be described in the following.

The fourth invention is a combination of the first invention (method of varying a gain level while maintaining a gain profile) and the third invention, which enables a gain level of a transmission line whose amplification characteristics are unknown to be varied without trial and error while maintaining a flat gain profile by measuring gain slope when a tendency of optimum power of pump light (coefficient in Expression 5) necessary for obtaining a flat gain on the model transmission line is examined in advance.

Procedure is as follows.

Preparation: Form a composite gain profile flat at a desired gain level on the model transmission line by trial and error, obtain in advance a tendency of optimum power of pump light (coefficient of Expression 5) necessary for obtaining a flat gain from $P_{\lambda n}$ then (procedure so far is equivalent to the first invention) and also measure gain slope $\Gamma^m_{\lambda n}$.

1. Measure gain slope $\Gamma^t_{\lambda n}$ of a transmission line whose Raman amplification characteristics are unknown and multiply $P\lambda n$ of the model transmission line by an inverse number of its ratio ($\Gamma^m_{\lambda n}/\Gamma^t_{\lambda n}$) to excite the transmission line 2. The same composite gain profile as that of the model transmission line is reproduced.

For the purpose of simplification of the description, the present embodiment is implemented as a development of the third embodiment. More specifically, as the model transmission line, a transmission line formed of SMF 80 km is used and as the transmission line whose Raman amplification characteristics are unknown, an 80 km NZ-DSF is used. In addition, the same pump wavelength and signal wavelength band are used. It is clearly understood that even if a totally different transmission line is used as the model transmission line or as the transmission line whose Raman amplification characteristics are unknown, or other pump wavelength and signal band are used, the present invention can be realized without any problem.

Figure 7:
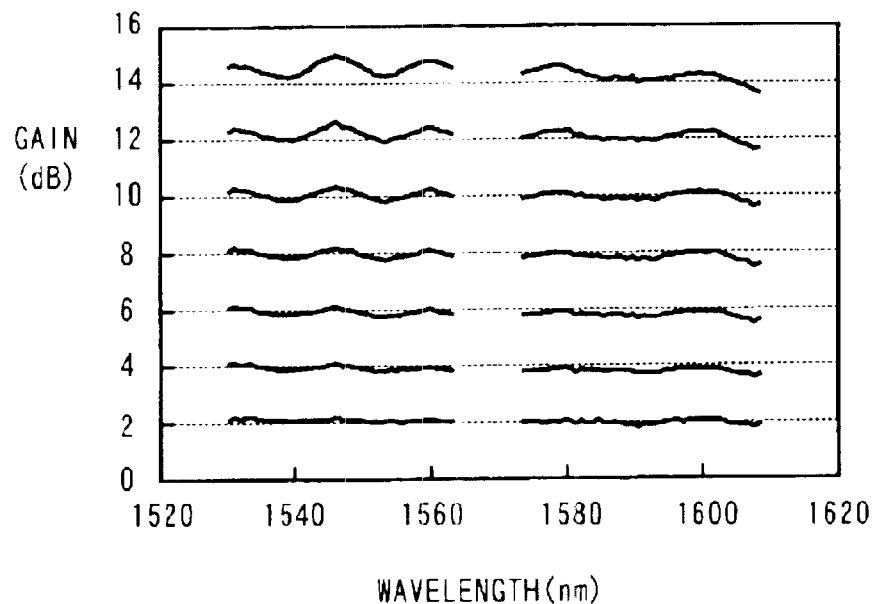
FIG. 7 is a diagram for use in explaining a result obtained by a fourth embodiment according to a fourth invention.

Then, generate a gain flat at the gain levels G of 2, 4, 6, 8, 10 and 12 dB similarly to the third embodiment in the NZ-DSF this time. It is only necessary to excite the fiber with the pump light power shown in Table 3 multiplied by $\Gamma^m_{\lambda n}/\Gamma^t_{\lambda n}$ (see Table 6). The obtained gain profile is shown in FIG. 7. The gain profile substantially the same as that shown in FIG. 2 is thus obtained.

TABLE 6

| GAIN (dB) | $\lambda_1$ | $\lambda_2$ | $\lambda_3$ | $\lambda_4$ | $\lambda_5$ | TOTAL |
|---|---|---|---|---|---|---|
| 2 | 13 | 13 | 10 | 11 | 29 | 76 |
| 4 | 29 | 28 | 20 | 22 | 53 | 152 |
| 6 | 47 | 45 | 32 | 33 | 72 | 228 |
| 8 | 68 | 65 | 44 | 43 | 85 | 305 |
| 10 | 92 | 86 | 57 | 53 | 92 | 381 |
| 12 | 118 | 110 | 70 | 63 | 94 | 457 |
| 14 | 146 | 134 | 84 | 72 | 89 | 524 |

(UNIT: mW)

Next, description will be made of principles and contents of a method of varying a gain inclination in an arbitrary fiber which is a fifth invention.

The fifth invention is an application of the third invention to the second invention. More specifically, even on a transmission line whose Raman amplification characteristics are unknown, by exciting the transmission line at a gain slope ratio ($\Gamma^m_{\lambda n}/\Gamma^t_{\lambda n}$) of the model transmission line to the transmission line, the same function of varying a gain inclination of a composite gain profile as that of the model transmission line can be reproduced.

Fifth embodiment of the fifth invention will be described in the following.

The fifth invention is a combination of the second invention (method of varying a gain inclination) and the third invention, which enables a composite gain profile having a gain inclination at an arbitrary gain level to be formed without trial and error even on a transmission line whose amplification characteristics are unknown only by measuring gain slope when a tendency of power of pump light (each coefficient in Expression 6) which has an arbitrary gain inclination is examined on the model transmission line in advance.

Procedure is as follows.

Preparation: Form a composite gain profile flat at a desired gain level on the model transmission line by trial and error, obtain in advance a tendency of optimum power of pump light (coefficient of Expression 5) necessary for obtaining a flat gain from $P_{\lambda,n}$ then (procedure so far is equivalent to the first invention) and also measure a gain inclination obtained when the gain inclination set value α of Expression 6 is changed to obtain in advance the coefficient E of Expression 6 based on the result (procedure so far is equivalent to the second invention). Measure gain slope $\Gamma^m_{\lambda,n}$ as well.

1. Apply the second invention to the third invention. More specifically, by exciting a transmission line whose Raman amplification characteristics are unknown at a gain slope ratio ($\Gamma^m_{\lambda,n}/\Gamma^t_{\lambda,n}$) of the model transmission line to the transmission line, the same composite gain profile having a gain inclination as that of the model transmission line can be reproduced.

For the purpose of simplification of the description, the present embodiment is also implemented as a development of the second embodiment. More specifically, as the model transmission line, a transmission line formed of SMF 80 km is used and as the transmission line whose Raman amplification characteristics are unknown, an 80 km NZ-DSF is used. In addition, the same pump wavelength and signal wavelength band are used. It is clearly understood that even if a totally different transmission line is used as the model transmission line or the transmission line whose Raman amplification characteristics are unknown, or other pump wavelength and signal band are used, the present invention can be realized without any problem.

Figure 8:
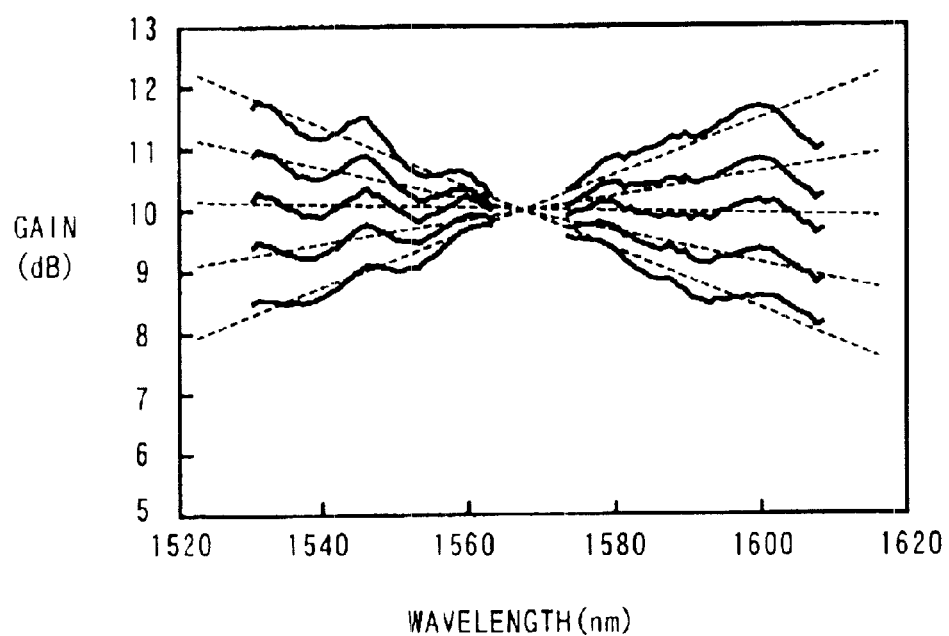
FIG. 8 is a diagram for use in explaining a result obtained by a fifth embodiment according to a fifth invention.

Then, similarly to the second embodiment, generate a gain having straight inclinations of ±2 dB and ±4 dB at the gain level G of 10 dB from end to end of the signal band in NZ-DSF this time. It is only necessary to excite the transmission line with the pump light power in Table 4 multiplied by $\Gamma^m_{\lambda,n}/\Gamma^t_{\lambda,n}$ (see Table 7). Obtained gain profile is shown in FIG. 8. Substantially the same gain profile as that of FIG. 4 can be thus obtained.

TABLE 7

| GAIN INCLINATION (dB) | $\lambda_1$ | $\lambda_2$ | $\lambda_3$ | $\lambda_4$ | $\lambda_5$ | TOTAL |
| --- | --- | --- | --- | --- | --- | --- |
| −4 | 109 | 99 | 61 | 51 | 55 | 374 |
| −2 | 100 | 92 | 58 | 51 | 71 | 374 |
| 0 | 91 | 85 | 56 | 52 | 90 | 374 |
| 2 | 81 | 76 | 53 | 53 | 111 | 373 |
| 4 | 67 | 64 | 48 | 54 | 139 | 373 |

(UNIT: mW)

Next, a sixth invention will be described. The sixth invention is a combination of the fourth and the fifth invention to control a gain level and a gain inclination so as to make monitor values of a signal light power and a signal light inclination be set values. Conduct negative-feedback of a difference between each monitor value and its set value to control the gain level and the gain inclination in a closed loop. In other words, the invention intends to realize active control so as to have optimum power of pump light all the time by coping with time-changing phenomena such as variation of an inter-station fiber loss and variation of signal transmission power of an immediately preceding repeater.

Figure 9:
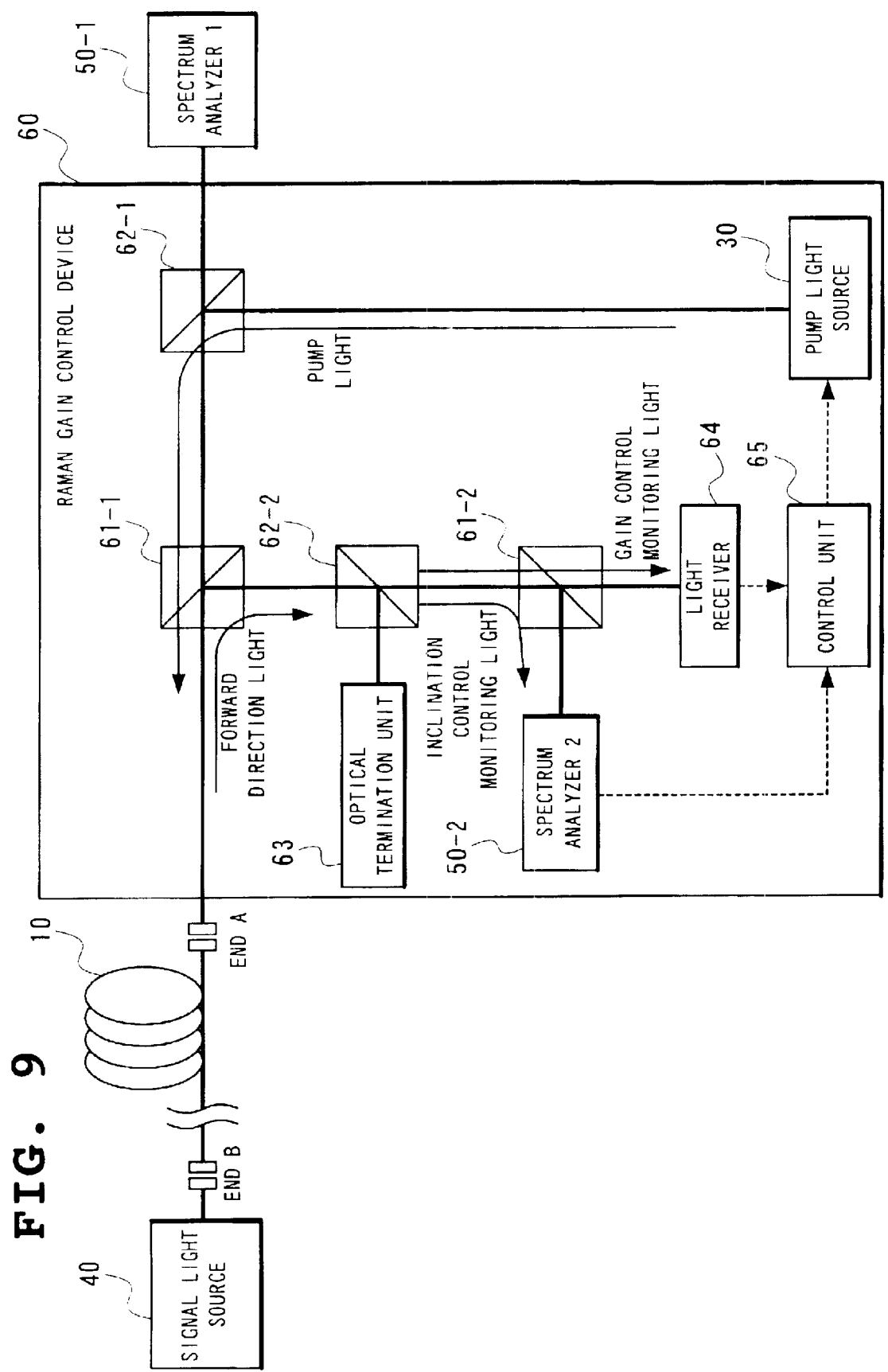
FIG. 9 is a diagram for use in explaining a structure of a sixth embodiment.

FIG. 9 is a structural diagram of a sixth embodiment which is an embodiment of the sixth invention. In addition to the components shown in FIG. 1, a TAP coupler 1 61-1 is provided between a WDM coupler 1 62-1 an the end A. Among three ports of the TAP coupler 1 61-1, a port connected to the end A will be referred to as an input port, a port connected to the WDM coupler 1 62-1 as a main port and the remaining port as a monitor port. A branch ratio between the main port and the monitor port is assumed to be 9:5:5.

To the monitor port, a WDM coupler 2 62-2 for demultiplexing an pump wavelength band and a signal wavelength band is connected. To an pump wavelength band port of the WDM coupler 2 62-2, an optical termination unit 63 is connected, so that taking out control monitor light from a signal light wavelength band port enables returned light of the pump light to be removed from the control monitor light.

To the signal wavelength band port of the WDM coupler 2 62-2, a TAP coupler 2 61-2 is connected to monitor 95% of the control monitor light by a light receiver and 5% by a spectrum analyzer 2 50-2. Monitored signal light power and the signal light inclination are negatively fed back to the power of the pump light through a control circuit 65.

Input to the control circuit 65 are the relation of Expression 6 obtained in advance at the model transmission line, gain slope $\Gamma^m_{\lambda,n}$, and gain slope $\Gamma^t_{\lambda,n}$ of a transmission line as an application destination. The control circuit 65 determines the gain level G of Expression 6 such that a signal of a difference between a monitor value and a set value of a signal light power attains 0 and determines a gain inclination α of Expression 6 such that a signal of difference between a monitor value and a set value of a signal light inclination attains 0. Multiple each power of pump light obtained by Expression 6 by $\Gamma^m_{\lambda,n}/\Gamma^t_{\lambda,n}$ and set the obtained power to the pump light source 30. Repetition of the negative-feedback enables monitor values of a signal light inclination and a signal light power to be maintained at the set values.

For the purpose of simplification of description, the present embodiment is implemented as a development of the fourth and fifth embodiments. More specifically, as the model transmission line, a transmission line formed of SMF 80 km is used and as the transmission line as an application destination, an 80 km NZ-DSF is used. In addition, the same pump wavelength and signal wavelength band are used. It is clearly understood that even if a totally different transmission line is used as the model transmission line or the transmission line whose characteristics are unknown, or other pump wavelength and signal band are used, the present invention can be realized without any problem.

Figure 10:
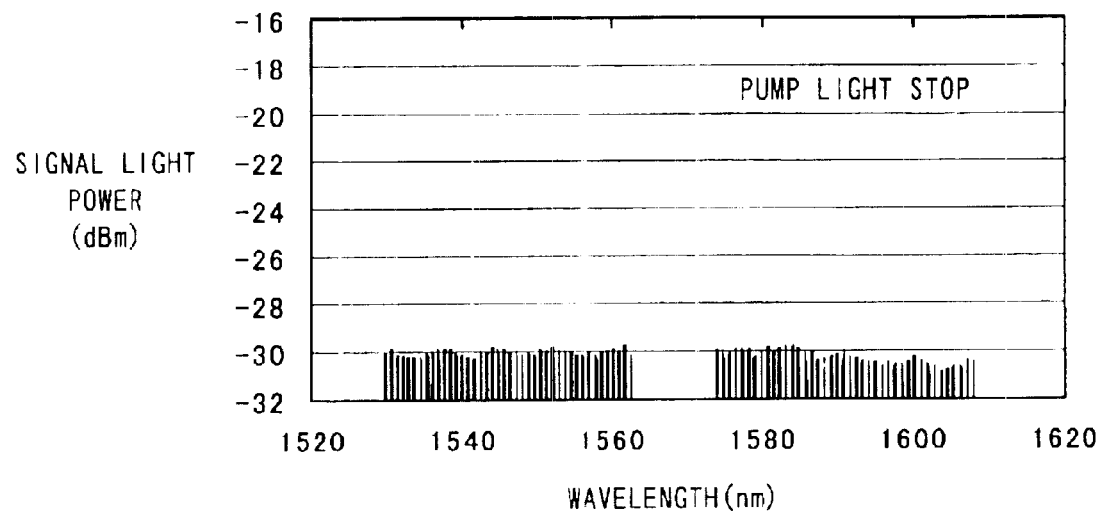
FIG. 10 is a diagram showing a signal light spectrum obtained when pump light is stopped in the sixth embodiment according to a sixth invention.
Figure 11:
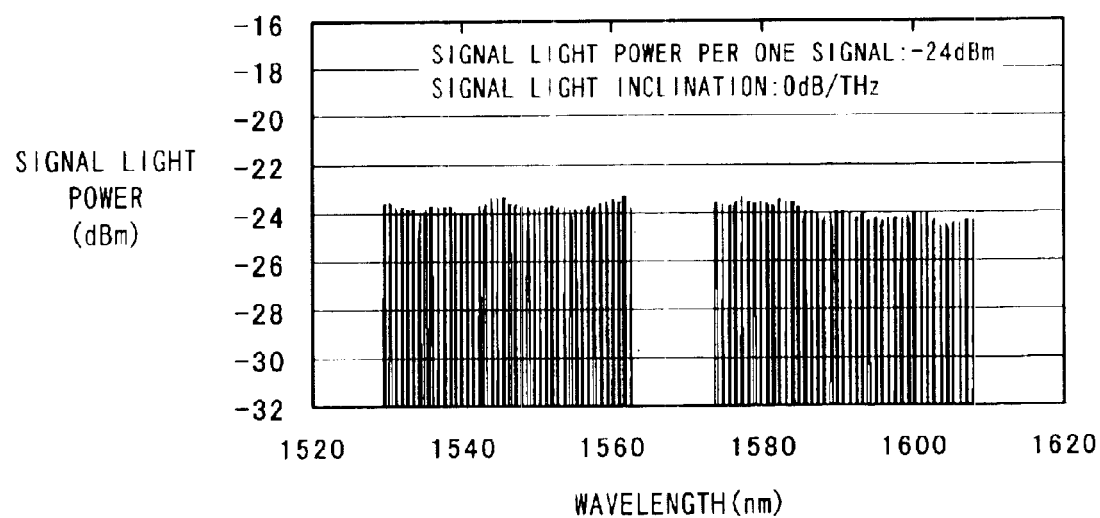
FIG. 11 is a diagram for use in explaining a result obtained by the sixth embodiment according to the sixth invention.
Figure 12:
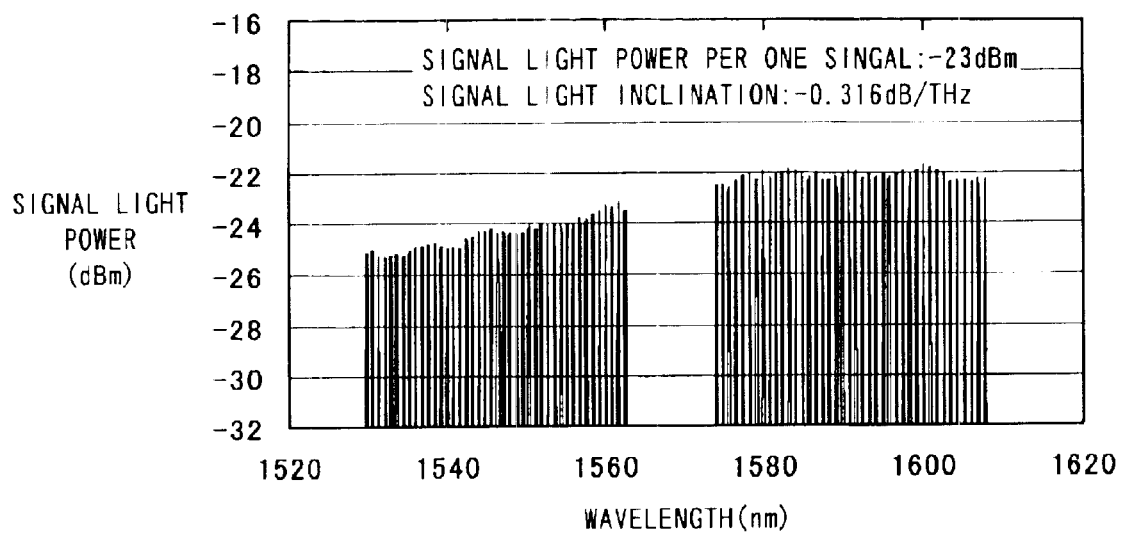
FIG. 12 is a diagram for use in explaining a result obtained by the sixth embodiment according to the sixth invention.
Figure 13:
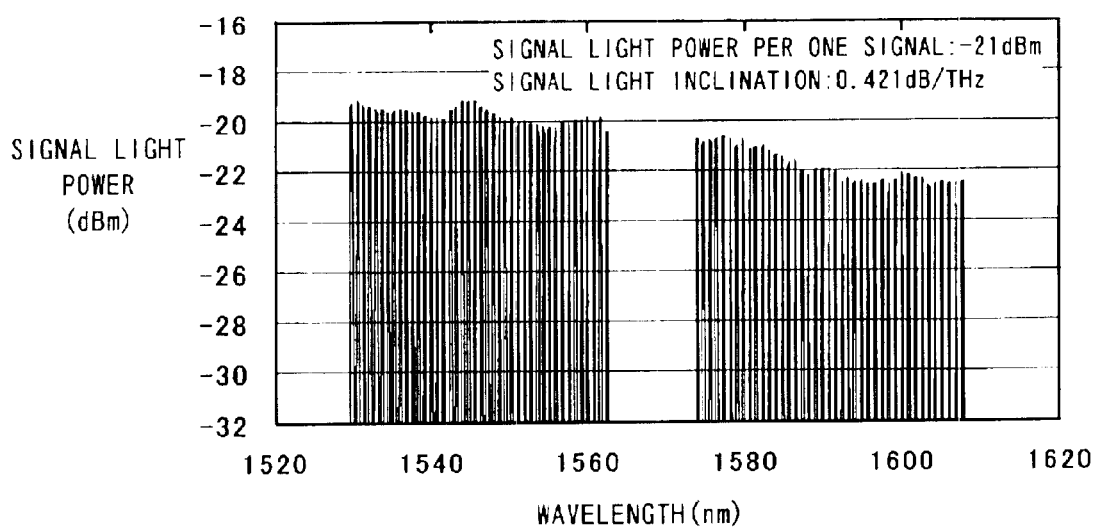
FIG. 13 is a diagram for use in explaining a result obtained by the sixth embodiment according to the sixth invention.
Figure 14:
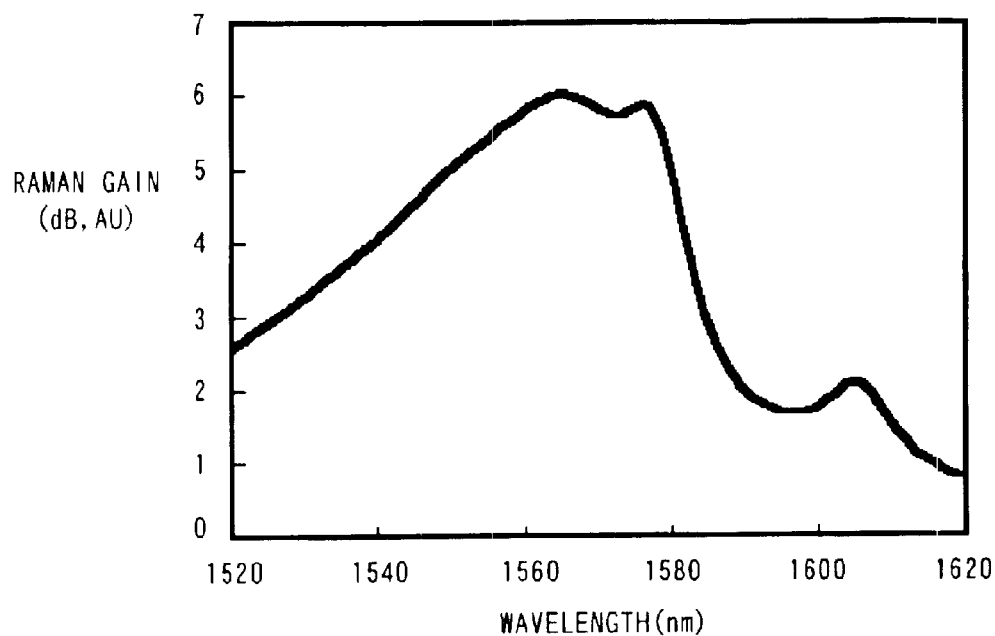
FIG. 14 is a diagram for use in explaining a single wavelength pump Raman gain profile.

Signal light spectrum observed by a spectrum analyzer 1 50-1 with the pump light stopped is shown in FIG. 10. In addition, signal light spectra observed by the spectrum analyzer 1 50-1 when negative feedback is conducted with a signal light power set value and a signal light inclination set value being set as indicated in Table 8 are shown in FIGS. 11, 12 and 13. Thus, a gain level and a gain inclination can be variably controlled such that a signal light power and a signal light inclination are maintained at the set values.

Although in the present embodiment, a signal light power and a signal light inclination are monitored to conduct negative-feedback control with both the gain level and the gain inclination of Expression 6 as parameters, it is also possible to monitor either the signal light power or the signal light inclination to conduct negative-feedback control with either one of the gain level and the gain inclination as a parameter. For example, with the gain inclination α being fixed, monitoring only the signal light power enables negative-feedback control using only the gain level as a parameter.

Although in the present embodiment, gain level control is realized by monitoring a signal light power of one wavelength, the control may be realized by monitoring other item. It is possible to control a gain level by monitoring, for example, signal light powers of all the wavelengths, a signal light power of a specific wavelength or a gain level itself.

TABLE 8

|  | FIG. 11 | FIG. 12 | FIG. 13 |
|---|---|---|---|
| SIGNAL LIGHT POWER PER ONE SIGNAL (dBm) | −24 | −23 | −21 |
| SIGNAL LIGHT INCLINATION(dB/THz) | 0 | −0.316 | 0.421 |

Although in the foregoing embodiments, the present invention has been described with respect to the arrangement of a backward pump Raman amplification, the present invention is applicable also to arrangement of forward pump Raman amplification.

Although the present invention has been described with respect to the preferred modes and embodiments in the foregoing, the present invention is not limited to the above-described modes and embodiments but be implemented in variation within a range of its technical idea.

As described in the foregoing, the following effects can be attained by the Raman gain control device and the Raman gain control method of the present invention.

According to the invention according to claim 1, with respect to a designated gain level G, power of each of a plurality of pump lights having different frequencies can be determined for realizing the gain level G by a flat gain profile. As a result, it is possible to obtain optimized power of pump light necessary for generating a desired gain level G in an open loop and also realize a designated gain level G while maintaining flatness of the gain profile.

According to the invention according to claim 4, with respect to a designated gain level G and a gain inclination α indicative of an inclination of a gain profile, power of each of a plurality of pump lights having different frequencies can be determined for realizing the gain level G by a gain profile having a straight inclination designated by the gain inclination α. As a result, it is possible to obtain an arbitrary gain inclination state in an open loop and also form a gain inclination straight at an arbitrary gain level.

According to the invention according to claim 7, a gain profile of a model transmission line can be reproduced on other transmission line. In other words, using each Raman gain slope of the model transmission line and other transmission line, power of each pump light in the model transmission line can be converted into power of pump light which realizes the same gain profile on other transmission line.

According to the invention according to claim 8, in the combination of the first invention and the third invention, first, with respect to a designated gain level G, determine power of each pump light realizing a flat gain profile on a model transmission line and convert the power of each pump light by using Raman gain efficiencies of the model transmission line and other transmission line, thereby obtaining optimized power of pump light necessary for generating the desired gain level G on other transmission line in an open loop, and also realizing the designated gain level G while maintaining flatness of the gain profile.

According to the invention according to claim 9, in the combination of the second invention and the third invention, first, with respect to designated gain level G and gain inclination α, determine power of each pump light realizing the gain level G by a gain profile having a straight inclination designated by the gain inclination α in the model transmission line and convert the power of each pump light by using Raman gain efficiencies of the model transmission line and other transmission line, thereby obtaining an arbitrary gain inclination state on other transmission line in an open loop and also forming an arbitrary straight gain inclination at an arbitrary gain level.

According to the invention according to claim 12, a monitoring result and a target value are compared such that a Raman gain within a designated wavelength range has a necessary value of a Raman gain, and its difference is negatively fed back to realize control in a closed loop.

According to the invention according to claim 13, a monitoring result and a target value are compared such that a Raman gain within a designated wavelength range and its inclination have a necessary value of a Raman gain and a value of its inclination, and its difference is negatively fed back to realize control in a closed loop.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A Raman gain control method of controlling a Raman gain caused by simultaneous application of pump lights of several wavelengths to an optical fiber, comprising the steps of:

on a model transmission line, obtaining a value of each power of each said pump light realizing a designated Raman gain within a designated wavelength range, with respect to each of said model transmission line and a transmission line as an application destination, obtaining a value of Raman gain slope generated by application of each said pump light, with respect to each said pump light, calculating a value obtained by multiplying power of pump light in question realizing said desired Raman gain on said model transmission line by a ratio indicative of how many times the value of said Raman gain slope of the pump light in question on said model transmission line is the value of said Raman gain slope of the pump light in question on said transmission line as an application destination, and controlling power of each said pump light applied to said transmission line as an application destination to apply each said pump light at the power of each said calculated value, thereby realizing, on said transmission line as an application destination, said designated Raman gain the same as the gain of said model transmission line within said designated wavelength range.

2. The Raman gain control method as set forth in claim 1, wherein
the Raman gain in said designated wavelength range is controlled in an open loop.

3. A Raman gain control method of controlling a Raman gain caused by simultaneous application of pump lights of several wavelengths to an optical fiber, comprising the steps of:
based on a relation of a ratio coefficient which is a ratio of power of each said pump light to total power of all said pump lights with said Raman gain and a relation between said total power and said Raman gain in a model transmission line, from a designated value of said Raman gain, calculating power of each said pump light realizing said designated Raman gain within a designated wavelength range,
with respect to each of said model transmission line and a transmission line as an application destination, designating data of a value of Raman gain slope generated by application of each said pump light,
with respect to each said pump light, calculating a value obtained by multiplying power of pump light in question realizing said desired Raman gain on said model transmission line by a ratio indicative of how many times the value of said Raman gain slope of the pump light in question on said model transmission line is the value of said Raman gain slope of the pump light in question on said transmission line as an application destination, and
controlling power of each said pump light applied to said transmission line as an application destination to apply each said pump light at the power of each said calculated value,
thereby realizing, on said transmission line as an application destination, said designated Raman gain within said designated wavelength range.

4. The Raman gain control method as set forth in claim 3, wherein
the Raman gain in said designated wavelength range is controlled in an open loop.

5. An optical fiber transmission system for transmitting signal light from a transmission terminal station to a reception terminal station through an optical fiber as a signal transmission line, comprising:
a gain control device provided at said transmission or reception terminal station or a repeater plant for controlling a Raman gain by simultaneous application of pump lights of several wavelengths, wherein
said gain control device
on a model transmission line, designates data of each power of each said pump light realizing a desired Raman gain within a designated wavelength range,
with respect to each of said model transmission line and a transmission line as an application destination, designates data of a value of Raman gain slope generated by application of each said pump light,
with respect to each said pump light, calculates a value obtained by multiplying power of pump light in question realizing said desired Raman gain on said model transmission line by a ratio indicative of how many times the value of said Raman gain slope of the pump light in question on said model transmission line is the value of said Raman gain slope of the pump light in question on said transmission line as an application destination, and
controls power of each said pump light applied to said transmission line as an application destination to apply each said pump light at the power of each said calculated value,
thereby realizing, on said transmission line as an application destination, said designated Raman gain the same as the gain of said model transmission line within said designated wavelength range.

6. An optical fiber transmission system for transmitting signal light from a transmission terminal station to a reception terminal station through an optical fiber as a signal transmission line, comprising:
a gain control device provided at said transmission or reception terminal station or a repeater plant for controlling a Raman gain by simultaneous application of pump lights of several wavelengths, wherein
said gain control device
based on a relation of a ratio coefficient which is a ratio of power of each said pump light to total power of all said pump lights with said Raman gain and a relation between said total power and said Raman gain in a model transmission line, from a designated value of said Raman gain, calculates power of each said pump light realizing said designated Raman gain within a designated wavelength range,
with respect to each of said model transmission line and a transmission line as an application destination, designates data of a value of Raman gain slope generated by application of each said pump light,
with respect to each said pump light, calculates a value obtained by multiplying power of pump light in question realizing said desired Raman gain on said model transmission line by a ratio indicative of how many times the value of said Raman gain slope of the pump light in question on said model transmission line is the value of said Raman gain slope of the pump light in question on said transmission line as an application destination, and
controls power of each said pump light applied to said transmission line as an application destination to apply each said pump light at the power of each said calculated value,
thereby realizing, on said transmission line as an application destination, said designated Raman gain within said designated wavelength range.

7. A Raman gain control device for controlling a Raman gain caused by simultaneous application of pump lights of several wavelengths to an optical fiber, comprising:
means for designating, on a model transmission line, data of each power of each said pump light realizing a desired Raman gain within a designated wavelength range,
means for designating, with respect to each of said model transmission line and a transmission line as an application destination, data of a value of Raman gain slope generated by application of each said pump light,
means for calculating, with respect to each said pump light, a value obtained by multiplying power of pump light in question realizing said desired Raman gain on said model transmission line by a ratio indicative of how many times the value of said Raman gain slope of the pump light in question on said model transmission line is the value of said Raman gain slope of the pump light in question on said transmission line as an application destination, and means for controlling power of each said pump light applied to said transmission line as an application destination to apply each said pump light at the power of each said calculated value, thereby realizing, on said transmission line as an application destination, said desired Raman gain the same as the gain of said model transmission line within said designated wavelength range.

8. A Raman gain control device for controlling a Raman gain caused by simultaneous application of pump lights of several wavelengths to an optical fiber, comprising:

means for calculating, based on a relation of a ratio coefficient which is a ratio of power of each said pump light to total power of all said pump lights with said Raman gain and a relation between said total power and said Raman gain in a model transmission line, from a designated value of said Raman gain, power of each said pump light realizing said designated Raman gain within a designated wavelength range, means for designating, with respect to each of said model transmission line and a transmission line as an application destination, data of a value of Raman gain slope generated by application of each said pump light, means for calculating, with respect to each said pump light, a value obtained by multiplying power of pump light in question realizing said desired Raman gain on said model transmission line by a ratio indicative of how many times the value of said Raman gain slope of the pump light in question on said model transmission line is the value of said Raman gain slope of the pump light in question on said transmission line as an application destination, and means for controlling power of each said pump light applied to said transmission line as an application destination to apply each said pump light at the power of each said calculated value, thereby realizing, on said transmission line as an application destination, said designated Raman gain within said designated wavelength range.

* * * * *